US009334087B2

(12) United States Patent
Cho et al.

(10) Patent No.: US 9,334,087 B2
(45) Date of Patent: May 10, 2016

(54) STANDING POUCH

(75) Inventors: Byoung-Chol Cho, Seoul (KR);
Byoung-Gu Cho, Seoul (KR);
Byung-kwon Cho, Seoul (KR)

(73) Assignee: HARVEST CHARMFOODS CO., LTD., Anseong-si (KR)

( * ) Notice: Subject to any disclaimer, the term of this patent is extended or adjusted under 35 U.S.C. 154(b) by 344 days.

(21) Appl. No.: 13/019,394

(22) Filed: Feb. 2, 2011

(65) Prior Publication Data

US 2011/0188787 A1 Aug. 4, 2011

(30) Foreign Application Priority Data

Feb. 2, 2010 (KR) .................. 10-2010-0009501
Apr. 14, 2010 (KR) .................. 10-2010-0034079

(51) Int. Cl.
*B65D 30/16* (2006.01)
*B65D 30/22* (2006.01)
(Continued)

(52) U.S. Cl.
CPC ............ *B65D 31/12* (2013.01); *B65D 81/3484* (2013.01); *B65D 31/04* (2013.01); *F25D 3/08* (2013.01)

(58) Field of Classification Search
CPC ........ A45C 11/00; A45C 11/20; B65D 81/18; B65D 81/20; B65D 81/22; B65D 81/38; B65D 81/3484; B65D 30/08; B65D 30/16; B65D 30/22; B65D 27/08; B65D 27/12–27/30; F24J 1/00; A47J 36/24; A47J 36/28; A47J 36/30
USPC ............... 62/457.1, 457.2, 457.7, 457.9, 520; 383/104, 38, 110; 126/263.02, 263.05, 126/263.07; 165/46
See application file for complete search history.

(56) References Cited

U.S. PATENT DOCUMENTS 3,437,258 A * 4/1969 Kugler .......................... 383/104
3,935,993 A * 2/1976 Doyen et al. .................... 383/94
(Continued)

FOREIGN PATENT DOCUMENTS

CN 101389248 A 3/2009
JP 57-200927 U 7/1984
(Continued)

OTHER PUBLICATIONS

Machine translation for JP 2000-327042.*
(Continued)

*Primary Examiner* — Marc Norman
*Assistant Examiner* — Antonio R Febles
(74) *Attorney, Agent, or Firm* — Sughrue Mion, PLLC

(57) ABSTRACT

A standing pouch includes an external pack, and an internal pack which is disposed in the external pack to form a first temperature control space and a second temperature control space which are spaced from each other, to form a contents accommodating space between the first temperature control space and the second temperature control space to accommodate contents. The first temperature control space can communicate with the second temperature control space. A first temperature control member and a second temperature control member are respectively disposed in the first temperature control space and the second temperature control space, and at least one of the first temperature control space and the second temperature control space have an open upper side to put a reactant liquid reacting with the first and second temperature control members to generate an exothermic or endothermic reaction.

12 Claims, 29 Drawing Sheets

(51) Int. Cl.
*B65D 81/34* (2006.01)
*F25D 3/08* (2006.01)
*B65D 30/08* (2006.01)

(56) References Cited

U.S. PATENT DOCUMENTS

| | | | | |
|---|---|---|---|---|
| 4,127,155 | A | * | 11/1978 | Hydorn ............................ 383/26 |
| 4,522,190 | A | * | 6/1985 | Kuhn et al. ............... 126/263.02 |
| 5,237,838 | A | * | 8/1993 | Merritt-Munson .......... 62/457.2 |
| 5,534,020 | A | * | 7/1996 | Cheney et al. ................ 607/108 |
| 5,840,080 | A | * | 11/1998 | Der Ovanesian ............ 607/114 |
| 6,289,889 | B1 | * | 9/2001 | Bell et al. ................. 126/263.07 |
| 6,652,933 | B2 | * | 11/2003 | Hall .............................. 428/34.2 |
| 2007/0206888 | A1 | * | 9/2007 | Chang ............................ 383/200 |
| 2008/0002918 | A1 | * | 1/2008 | Steele ............................. 383/38 |
| 2008/0226207 | A1 | * | 9/2008 | Frayne .......................... 383/109 |
| 2010/0086238 | A1 | * | 4/2010 | Sprehe ............................ 383/38 |

FOREIGN PATENT DOCUMENTS

| | | | | |
|---|---|---|---|---|
| JP | 59106882 | | 7/1984 | |
| JP | 60-134765 | | 9/1985 | |
| JP | 06-171673 | A | 6/1994 | |
| JP | 2923782 | B1 | 7/1999 | |
| JP | 2000-327042 | A | 11/2000 | |
| JP | 2004-026173 | A | 1/2004 | |
| JP | 2005-110885 | A | 4/2005 | |
| JP | 2008-023363 | A | 2/2008 | |
| JP | 2009196714 | A * | 9/2009 | ............. B65D 81/32 |
| JP | 2011025944 | A * | 2/2011 | ............. B65D 30/22 |
| KR | 20100106691 | * | 9/2010 | ............. B65D 30/22 |
| WO | WO 2008082283 | A1 * | 7/2008 | ............. B65D 81/34 |

OTHER PUBLICATIONS

Machine translation for JP 11-346923.*
Korean Office Action for related Korean Application No. 10-2010-0009501, dated Apr. 14, 2010.
Communication from Chinese Patent Office issued Sep. 4, 2014, in counterpart Chinese Application No. 201110036155.7.
Communication issued on Jan. 5, 2015 by The State Intellectual Property Office of P.R. China in related application No. 201110036155.7.

* cited by examiner

STANDING POUCH

CROSS-REFERENCE TO RELATED APPLICATION

This application claims priorities from Korean Patent Applications No. 10-2010-0009501, filed on Feb. 2, 2010 and No. 10-2010-0034079, filed on Apr. 14, 2010 in the Korean Intellectual Property Office, the disclosures of which are incorporated herein by reference.

BACKGROUND

1. Field

Exemplary embodiments relate to a standing pouch, and more particularly, to a standing pouch for easy carriage and storage.

2. Description of the Related Art

A standing pouch stands alone without any help from an aid. A conventional pouch always accommodates liquid food, such as oriental medicine, or face packs to be heated or cooled inside, and includes a container accommodating a reactant liquid and a heat releasing element or a heat absorbing element disposed outside the container. The container is cut so that the reactant liquid, for example, water, is discharged to react with the heat releasing element or the heat absorbing element, thereby heating the food or cooling the face packs.

However, since the conventional pouch accommodates the reactant liquid and the heat releasing element or the heat absorbing element together, an exothermic or endothermic reaction may occur to bring about unexpected results when water leaks during carriage or due to user's mistakes.

Further, the pouch including the reactant liquid is not easy for carriage or storage due to weight or volume of the reactant liquid.

Moreover, as the pouch always includes contents to be heated or cooled, a user may not heat or cool optional contents.

In addition, the container and the heat releasing element or the heat absorbing element are sealed, and thus the pouch is not recyclable once used.

Meanwhile, when retort food is accommodated in the pouch, sterilization processes are considered.

SUMMARY

Accordingly, one or more exemplary embodiments provide a standing pouch to prevent an unexpected endothermic or exothermic reaction from occurring.

Further, one or more exemplary embodiments provide a standing pouch for easy carriage and storage.

In addition, one or more exemplary embodiments provide a standing pouch which enables a user to heat or cool optional contents.

Also, one or more exemplary embodiments provide a standing pouch recyclable.

Moreover, one or more exemplary embodiments provide a standing pouch which is used for packaging retort food in a sanitary way.

The foregoing and/or other aspects may be achieved by providing a standing pouch including: an external pack; an internal pack which is disposed in the external pack to form a first temperature control space and a second temperature control space which are spaced from each other, to form a contents accommodating space between the first temperature control space and the second temperature control space to accommodate contents, and to enable the first temperature control space to communicate with the second temperature control space; and a first temperature control member and a second temperature control member which are respectively disposed in the first temperature control space and the second temperature control space, at least one of the first temperature control space and the second temperature control space having an open upper side to put a reactant liquid reacting with the first and second temperature control members to generate an exothermic or endothermic reaction.

The external pack may include a front external part and a back external part which faces each other and are sealed at opposite lateral sides; and a bottom external part which is sealed and coupled with a lower part of the front external part and a lower part of the back external part so that the lower parts of the front external part and the back external part are spaced from each other.

The internal pack may be sealed with the lower parts of the front external part and the back external part at opposite lateral sides and may be not sealed at a bottom side so that the first temperature control space communicates with the second temperature control space.

The internal pack may include: a first internal part having an open upper side and being sealed at opposite lateral sides and a bottom side with respect to the front external part; and a second internal part being sealed at opposite lateral sides and a bottom side with respect to the back external part, the first and second internal parts may include a common communication hole to enable the first temperature control space to communicate with the second temperature control space, and the first and second internal parts may be sealed around the communication hole.

The standing pouch may further include a sealing unit which is installed in the internal pack to selectively seal the contents accommodating space.

The standing pouch may further include contents which are put in the contents accommodating space, and the external pack and the internal pack may be sealed at an upper side than a position where the sealing unit is installed.

The sealing unit may include a fastener of a zip, Velcro, or Ziploc manner provided in corresponding positions.

The first and second temperature control members may include at least one of a heat releasing element and a heat absorbing element.

The foregoing and/or other aspects may be achieved by providing a standing pouch including: a first pack which includes a first internal part and a second internal part to form an accommodating space where contents are accommodated; a first external part which is disposed to face the first internal part to form a first temperature control space; and a first temperature control member which is disposed in the first temperature control space, a reactant liquid having an exothermic or endothermic reaction with the first temperature control member not being accommodated in the accommodating space and the first temperature control space, and the first internal part and the first external part being sealed to close the first temperature control space.

A sealed part of the first internal part and the first external part may have a different width in a transverse direction.

The standing pouch may further include a first ripping part which is formed on at least one of the first internal part, the second internal part, and the first external part to rip the first internal part and the first external part in a transverse direction so that the first temperature control space is open.

The first internal part and the second internal part may be sealed so that the first internal part and the second internal part are attached to each other even through the first internal part and the first external part are ripped in the transverse direction using the first ripping part.

The standing pouch may further include a second ripping part which rips the first internal part and the second internal part which are sealed, in the transverse direction so that the accommodating space is open.

The standing pouch may further include: a second external part which is disposed to face the second internal part in order to form a second temperature control space; and a second temperature control member which is disposed in the second temperature control space, and the second internal part and the second external part may be sealed to close the second temperature control space.

A sealed part of the second internal part and the second external part may have a different width in a transverse direction.

The standing pouch may further include a first ripping part which is formed on at least one of the first external part and the second external part to rip the first pack, the first external part, and the second external part in the transverse direction so that at least one of the first temperature control space and the second temperature control space is open.

The first internal part and the second internal part may be sealed so that the first internal part and the second internal part are kept attached to each other when the first external part and the second external part are ripped in the transverse direction using the first ripping part.

The standing pouch may further include a second ripping part which is formed on at least one of the first external part and the second external part in order to rip the first internal part and the second internal part which are sealed, in the transverse direction so that the accommodating space is open.

As described above, according to exemplary embodiments, a standing pouch prevents an unexpected endothermic or exothermic reaction from occurring since a reactant liquid should be put by a user to generate an endothermic or exothermic reaction.

Also, the standing pouch does not include a reactant liquid occupying a relatively large weight and volume, and thus carriage and storage are easy.

A user is allowed to put desired contents to be heated or cooled into the pouch.

Moreover, the pouch is recyclable using a new heat releasing element and a reactant liquid after use.

Instead of a heat releasing element, a heat absorbing element or a proper combination of a heat releasing element and a heat absorbing element is used to heat or cool contents to a desired temperature.

Finally, the pouch is used to package retort food in a sanitary way. Before and after packaging the retort food, the standing pouch is properly sterilized.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
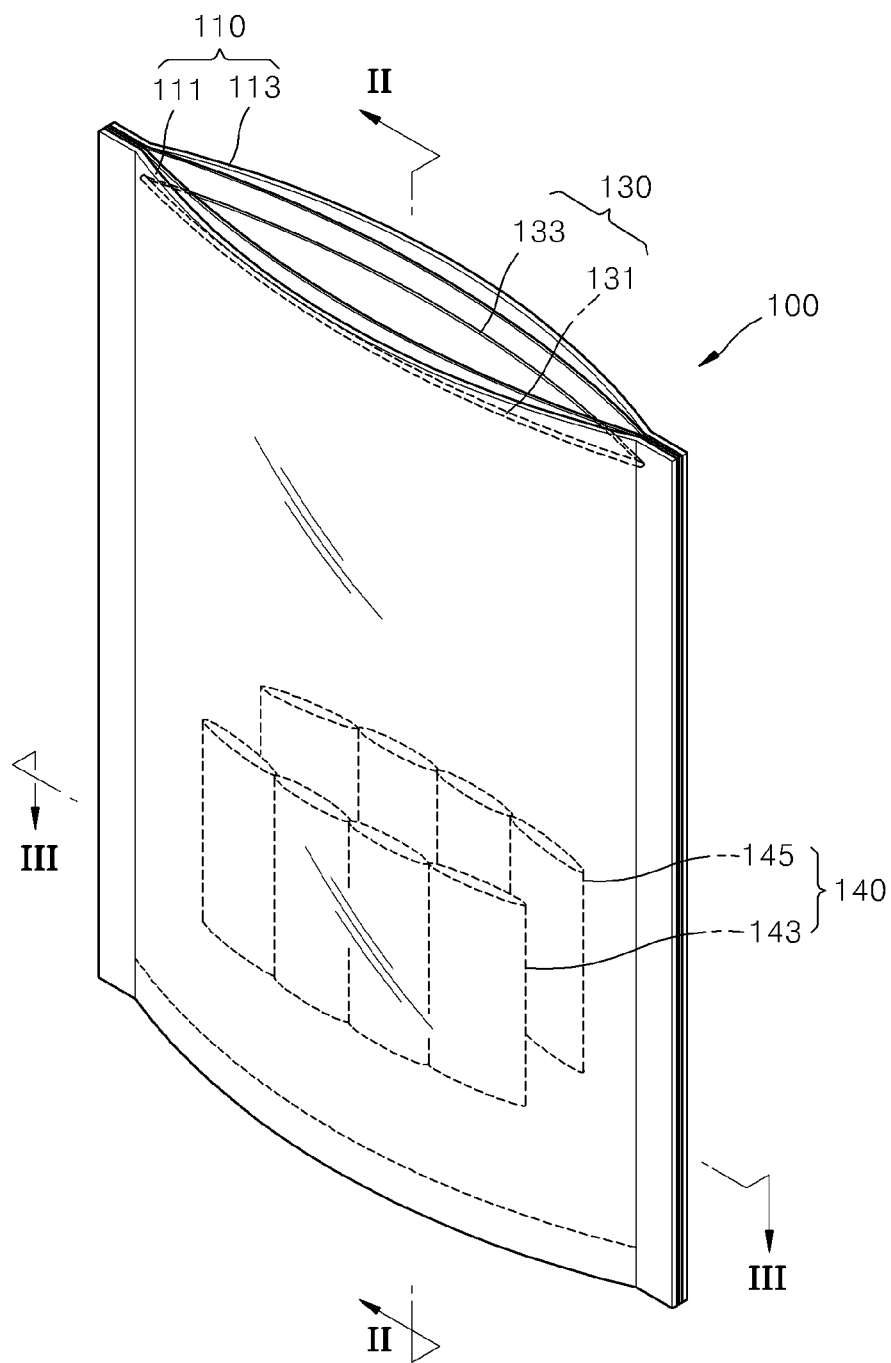
FIG. 1 is a schematic perspective view of a standing pouch according to a first exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

Hereinafter, a standing pouch according to exemplary embodiments will be described with reference to the accompanying drawings.

As shown in FIGS. 1 to 5, a standing pouch 100 according to a first exemplary embodiment includes an external pack 110 having an open upper side to put contents into, an internal pack 120 disposed in the external pack 110, and a temperature control unit 140 disposed in a temperature control space R1 and R2 formed between the external pack 110 and the internal pack 120.

The external pack 110 includes a front external part 111 and a back external part 113 facing each other and being sealed at opposite lateral sides, and a bottom external part 115 sealing and coupled with a lower part of the front external part 111 and a lower part of the back external part 113 so that the lower parts of the front external part 111 and the back external part 113 are spaced from each other. Accordingly, as the lower parts of the front external part 111 and the back external part 113 are separated from each other, the pouch 100 may be kept standing.

Figure 2:
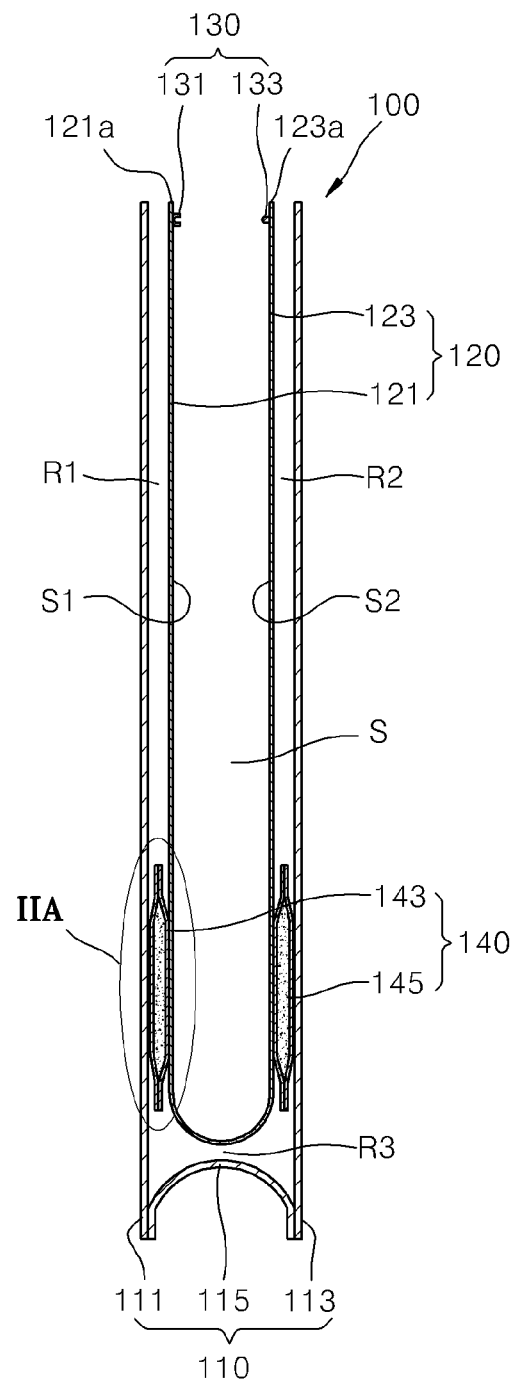
FIG. 2 is a schematic cross-sectional view of the standing pouch of FIG. 1, taken along line II-II.

As shown in FIG. 2, the internal pack 120 forms a contents accommodating space S where contents to be heated or cooled are accommodated.

Further, the internal pack 120 forms, along with the external pack 110, a first temperature control space R1 and a second temperature control space R2 which are spaced from each other with the contents accommodating space S disposed therebetween.

In addition, the internal pack 120 forms a communication space R3 which enables the first temperature control space R1 to communicate with the second temperature control space R2.

Figure 3:
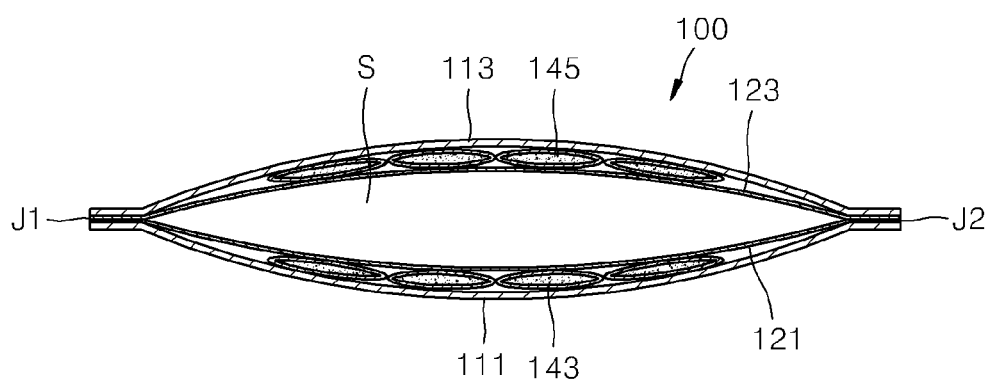
FIG. 3 is a schematic cross-sectional view of the standing pouch of FIG. 1, taken along line III-III.

The internal pack 120 includes a first internal part 121 disposed adjacently to the front external part 111 to form the first temperature control space R1 and a second internal part 123 disposed adjacently to the back external part 113 to form the second temperature control space R2. The first internal part 121 and the second internal part 123 are sealed at lower parts so that a space between the first internal part 121 and the second internal part 123 forms the contents accommodating space S. Here, the internal pack 120 may be an integrated flexible bag, shown in FIG. 2. In detail, the internal pack 120 may be prepared by disposing the flexible bag having an open upper side of FIG. 2 between the front external part 111 and the back external part 113, sealing opposite lateral sides J1 and J2, and not sealing a bottom side, as shown in FIG. 3. Here, a bottommost side of the flexible bag is not in contact with the bottom external part 115 but is spaced therefrom to form the communication space R3. However, the above configuration is just an illustrative example and may be modified variously.

The temperature control unit 140 may include at least one of a heat releasing element having an exothermic reaction with a reactant liquid and a heat absorbing element having an endothermic reaction with the reactant liquid. Here, the heat releasing element and the heat absorbing element may be collectively referred to as a temperature control element since the heat releasing element and the heat absorbing element respectively increase and decrease temperature of contents put in the contents accommodating space S.

Examples of the heat releasing element may include at least one of calcium oxide, calcium hydroxide, magnesium chloride, and iron. In addition to the above compounds, the heat releasing element may be substituted or replaced by any other materials which have an exothermic reaction with the reactant liquid.

Examples of the heat absorbing element may include at least one of ammonium nitrate ($NH_4NO_3$), sodium acetate (NaOAc), and urea.

The temperature control unit 140 may further include a nonwoven fabric, felt or the like to enclose the heat releasing element or the heat absorbing element. The nonwoven fabric has a hygroscopic property to absorb the reactant liquid, thereby easing a chemical reaction of the heat releasing element or the heat absorbing element accommodated therein with the reactant liquid. As necessary, the nonwoven fabric may be omitted.

The temperature control unit 140 may include a first temperature control member 143 accommodated in the first temperature control space R1 and a second temperature control member 145 accommodated in the second temperature control space R2.

Here, the first and second temperature control members 143 and 145 may be installed in the first and second temperature control spaces R1 and R2 in advance or may be put by a user in the first and second temperature control spaces R1 and R2.

Figure 2A:
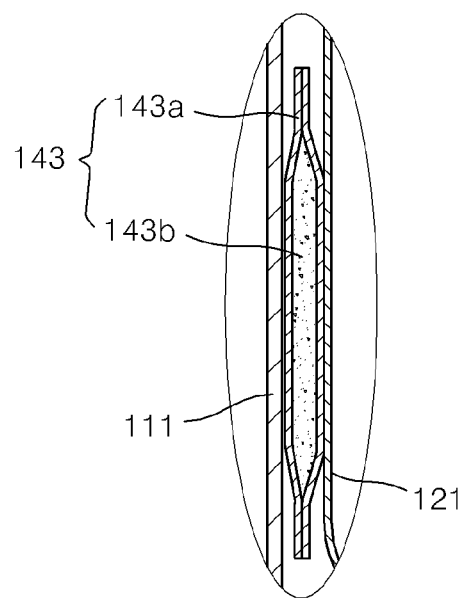
FIG. 2A is an enlarged view of IIA of FIG. 2.

Referring to FIG. 2A, the first temperature control member 143 includes a nonwoven fabric 143a and a temperature control member 143b accommodated in the nonwoven fabric 143a. Here, the temperature control member 143b may be the heat releasing element.

The second temperature control member 145 may be configured in the same form as the first temperature control member 143. That is, the second temperature control member 145 may also include the heat releasing element inside.

As necessary, for example, when a contact side S1 of the contents accommodating space S in contact with the first temperature control space R1 is to be heated and a contact side S2 thereof in contact with the second temperature control space R2 is to be cooled, the first temperature control member 143 includes the heat releasing element and the second temperature control member 145 includes the heat absorbing element.

Here, at least one of the first temperature control space R1 and the second temperature control space R2 may be formed to have an open upper side to put the reactant liquid into.

In detail, an upper end 121a of the first internal part 121 may not be sealed with an upper end of the front external part 111 so that the first temperature control space R1 has the open upper side. The second temperature control space R2 may be sealed after the second temperature control member 145 is accommodated inside. As necessary, an upper end 123a of the second internal part 123 may also not be sealed with an upper end of the back external part 113 so that the second temperature control space R2 has the open upper side.

As shown in FIG. 2, the standing pouch 100 may further include a sealing unit 130 to selectively seal the contents accommodating space S formed by the internal pack 120.

The sealing unit 130 may include a fastener of a zip, Velcro, or Ziploc manner provided in corresponding positions.

FIG. 2 illustrates an example of the sealing unit 130, which is a Ziploc fastener.

The sealing unit 130 includes a female Ziploc 131 installed on an upper inside of the first internal part 121 and a male Ziploc 133 installed in a corresponding position of the second internal part 123 to the female Ziploc 131.

Figure 4:
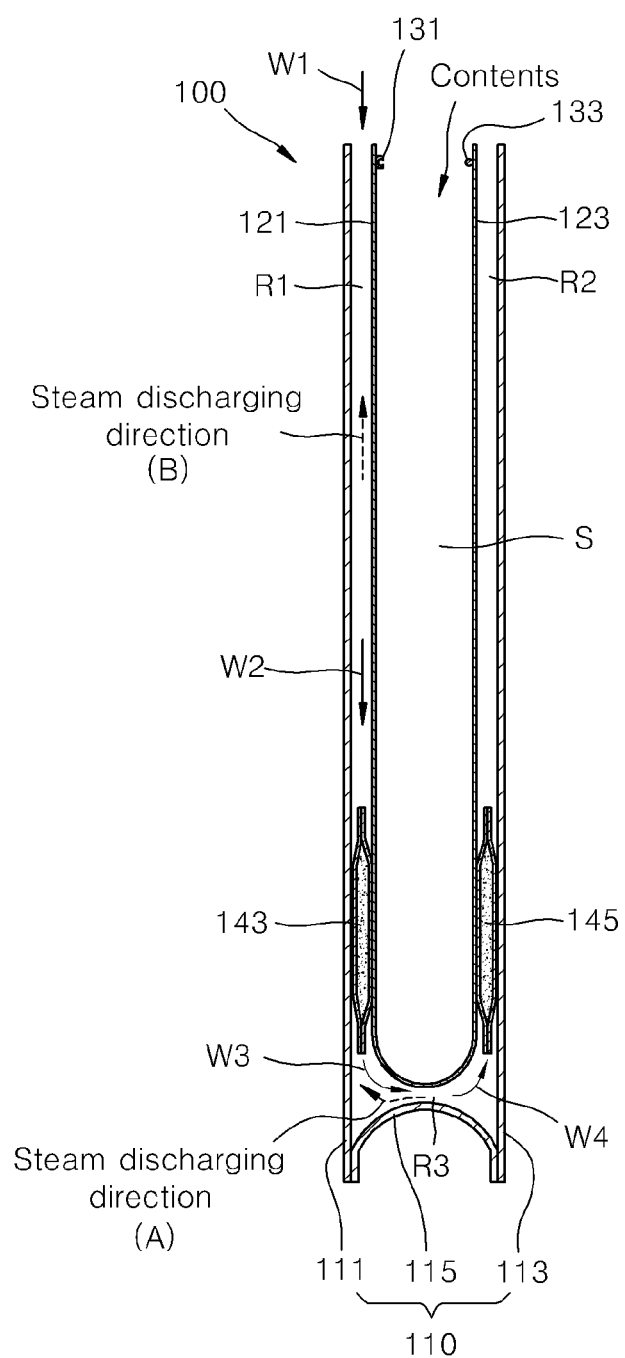
FIGS. 4 and 5 are schematic cross-sectional views illustrating use of the standing pouch of FIG. 1.

Hereinafter, a method of heating contents using the standing pouch 100 having the above configuration is described with reference to FIGS. 4 and 5.

First, contents to be heated are put in the contents accommodating space S with the sealing unit 130 being open.

A reactant liquid, for example, water, is put into the first temperature control space R1 through the unsealed upper end of the first internal part 121 and the front external part 111. Accordingly, the reactant liquid travels in the first and second temperature control spaces R1 and R2 in order of W1, W2, W3, and W4.

First, the reactant liquid exothermically reacts with the first temperature control member 143 accommodated in the first temperature control space R1. Here, generated steam is discharged in a direction B to an outside through the open upper end.

Then, the remaining reactant liquid, which is not involved in the exothermic reaction with the first temperature control member 143, flows into the second temperature control space R2 through the communication space R3. Accordingly, the second temperature control member 145 accommodated in the second temperature control space R2 also exothermically react.

Steam generated by the exothermic reaction in the second temperature control space R2 may be discharged to the outside in a direction A along the communication space R3 through the unsealed upper end of the first internal part 121 and the front external part 111. When the upper side of the second temperature control space R2 is open, as shown in FIGS. 4 and 5, that is, when the upper end 123a of the second internal part 123 and the upper end of the back external part 113 are not sealed, the steam may be discharged through the upper side of the second temperature control space R2.

Figure 5:
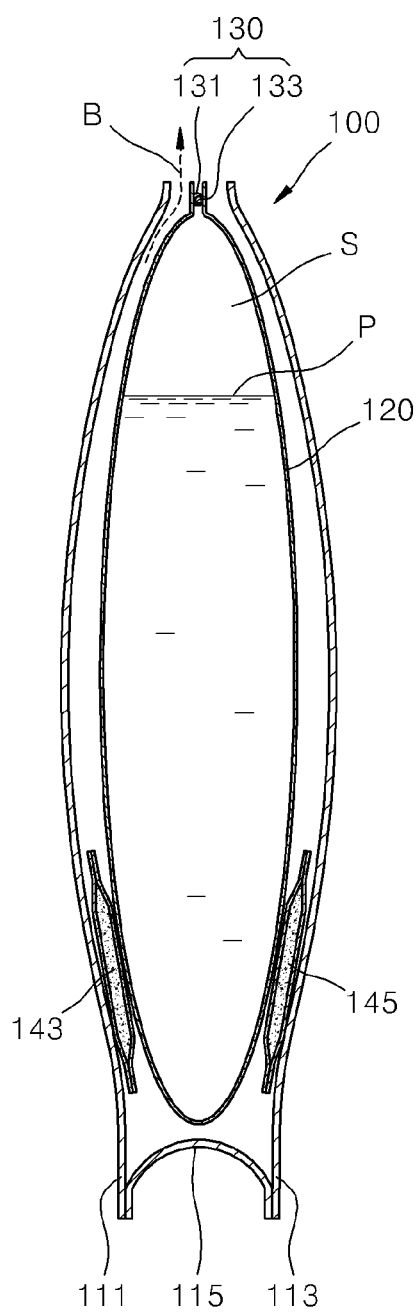

Here, as shown in FIG. 5, in order to prevent heat loss, the contents P are put into the contents accommodating space S, the contents accommodating space S is sealed using the sealing unit 130, and then the reactant liquid is put into the first temperature control space R1 after.

As described above, using the standing pouch 100 of the exemplary embodiments, the user may heat or cool desired contents.

Further, since the user put a temperature control member into the first and second temperature control spaces based on a heating or cooling temperature, the contents may be heated or cooled to the temperature as necessary.

Here, the temperature control member may be provided quantifiably by the piece. For example, there is a case where one temperature control member heats water by 10° C.

When the user desires to heat soup kept at about −3° C. in a refrigerator to 60(C, about six temperature control members are equally divided and put in the first temperature control space and the second temperature control space, and the reactant liquid, water, is put thereto, so that the soup is heated to the desired temperature.

Further, after being used once, the standing pouch 100 according to the exemplary embodiments may be reused to heat or cool contents by putting another temperature control member.

In the above description, the external pack 110 has the open upper side so that the user puts desired contents thereto, but the external pack 110 may be sealed if necessary. In detail, in a process of manufacturing the standing pouch 100, contents may be put into the contents accommodating space S, and then the upper side of the internal pack 120 and the upper side of the external pack 110 may be sealed. Here, the sealed portion may be an upper side of the sealing unit 130 positioned at the upper end of the internal pack 120. Accordingly, the user heats or cools the contents, tears or rips the sealed portion to open the sealing unit 130, and takes or picks out the inside contents. Further, after taking or picking out the contents, the remaining contents may be kept in the standing pouch 100 by sealing using the sealing unit 130.

Here, the contents may be liquid food, such as soup and drinks, or solid materials, such as face packs. The above examples are given just for illustrations, but the contents may include any materials to be heated or cooled.

Figure 6:
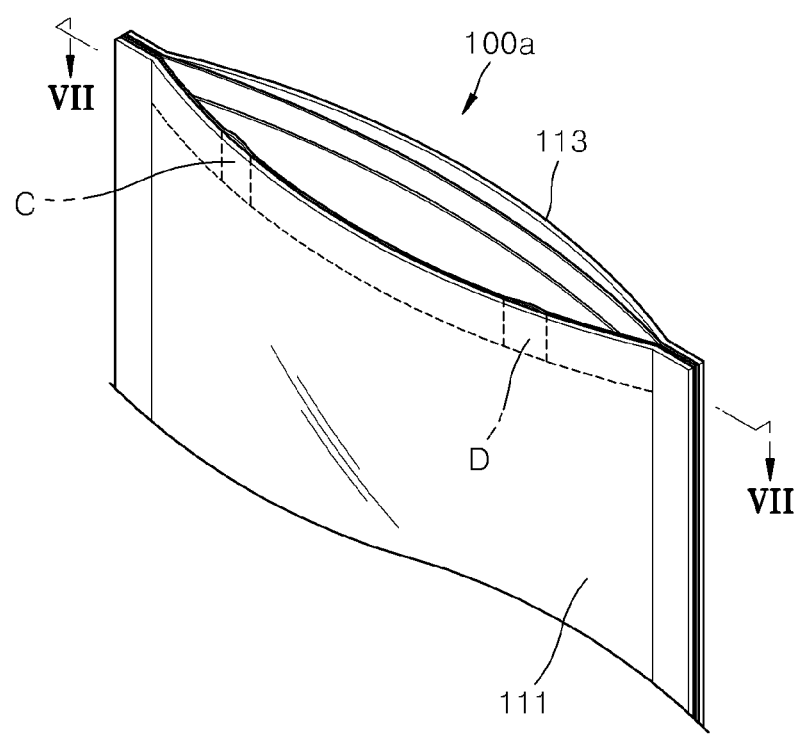
FIG. 6 is an enlarged perspective view of a main part of a standing pouch according to a second exemplary embodiment.
Figure 7:
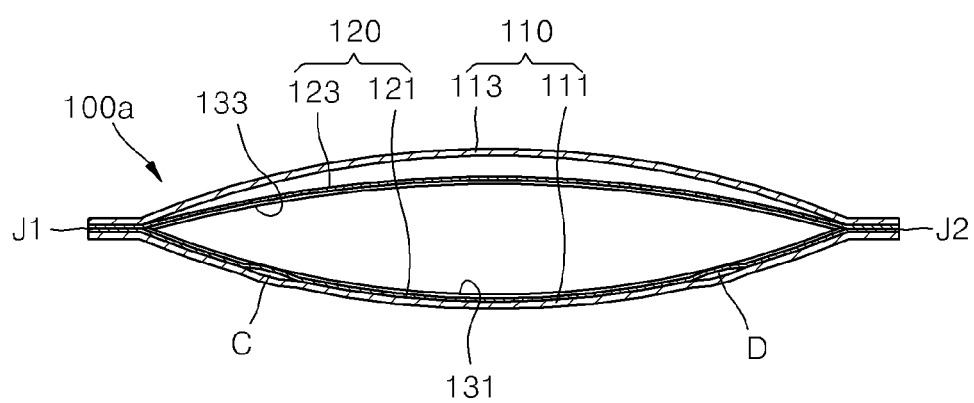
FIG. 7 is a schematic cross-sectional view of the standing pouch of FIG. 6, taken along line VII-VII.
Figure 8:
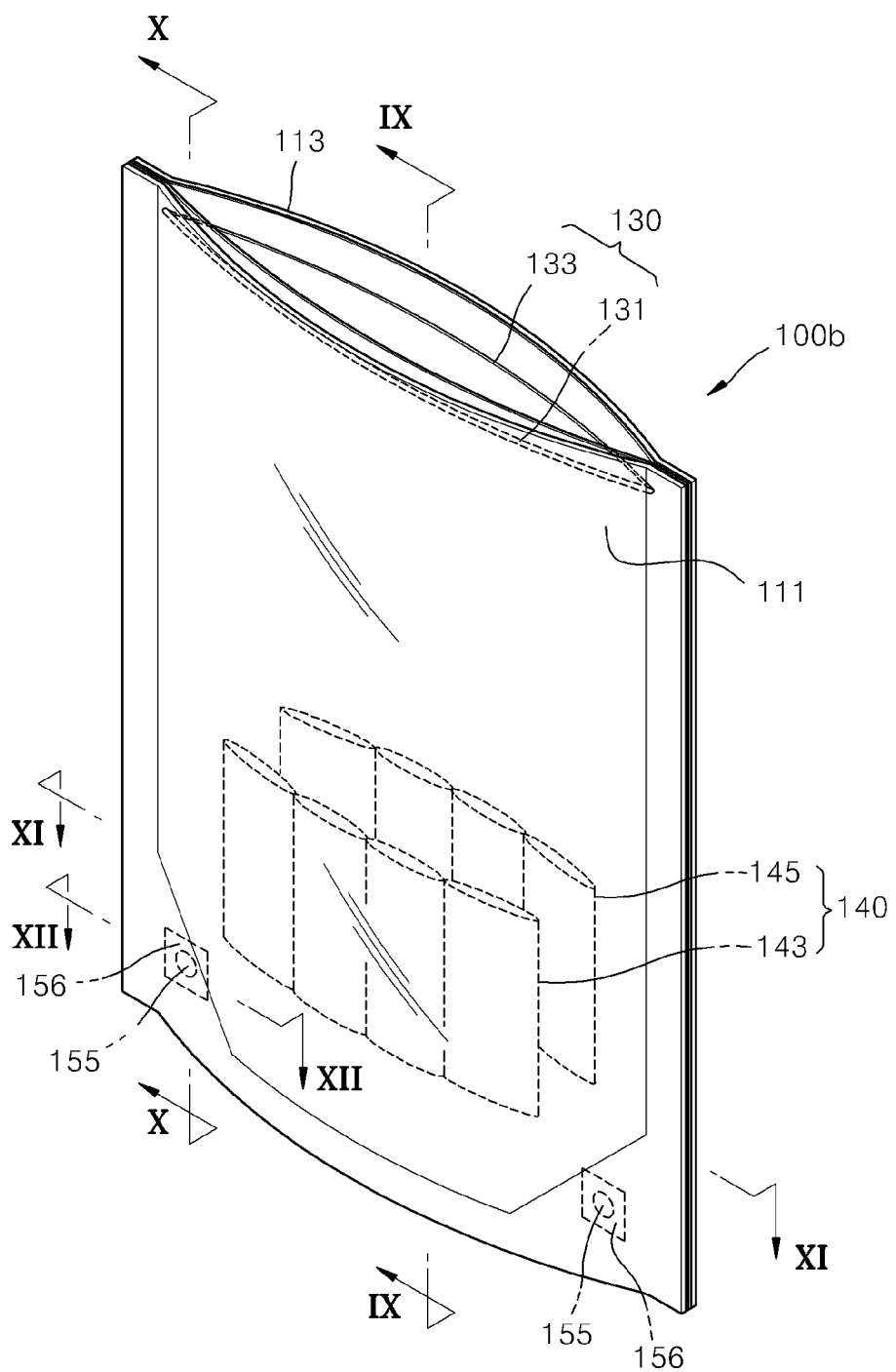
FIG. 8 is a schematic perspective view of a standing pouch according to a third exemplary embodiment.

Referring to FIGS. 6 and 7, a standing pouch 100a according to a secondary exemplary embodiment further includes steam outlets C and D formed between an external pack and an internal pack 120. Except for the steam outlets C and D, the standing pouch 100a has the same configuration as the standing pouch 100 according to the first exemplary embodiment, and thus redundant descriptions thereof will be omitted.

FIG. 7 is a schematic cross-sectional view of the pouch 100a of FIG. 6.

As shown in FIG. 7, an upper end of a front external part 111 of the external pack 110 and an upper end of a first internal part 121 of the internal pack 120 may be entirely sealed except for the steam outlets C and D. An upper end of a back external part 113 of the external pack 110 and an upper end of a second internal part 123 of the internal pack 120 may be sealed only on opposite lateral sides and not be sealed in a middle portion. Accordingly, a reactant liquid may be introduced through an opening at the unsealed upper end between the back external part 113 and the second internal part 123.

Here, the steam outlets C and D are formed to discharge steam when a first temperature control member (not shown) accommodated in a first temperature control space (not shown) of the standing pouch 100a includes a heat releasing element. Thus, when the first temperature control member accommodated in the first temperature control space includes a heat absorbing element, the steam outlets C and D are not formed.

Hereinafter, a standing pouch 100b according to a third exemplary embodiment is described with reference to FIGS. 8 to 14. The same reference numerals as in the first exemplary embodiment refer to the same elements as in the first exemplary embodiment.

The standing pouch 100b according to the third exemplary embodiment includes an external pack 110 having an open upper side to put contents into, an internal pack 150 disposed in the external pack 110, and a temperature control unit 140 disposed in first and second temperature control spaces R1 and R2 formed between the external pack 110 and the internal pack 150.

Figure 9:
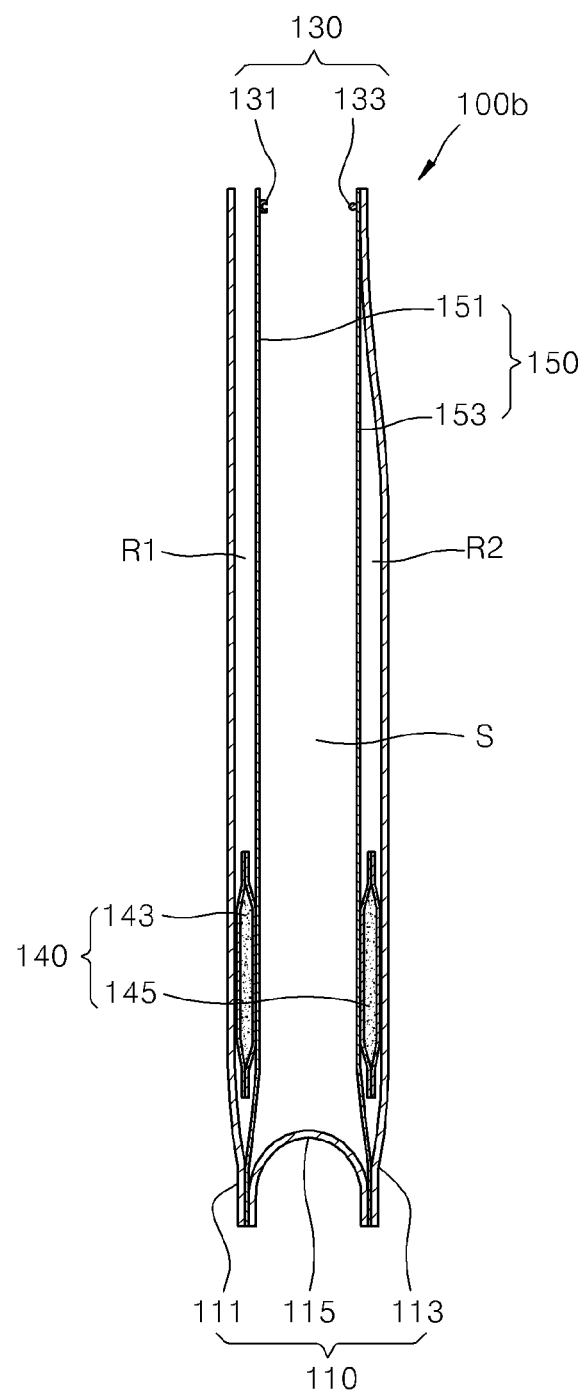
FIG. 9 is a schematic cross-sectional view of the standing pouch of FIG. 8, taken along line IX-IX.
Figure 10:
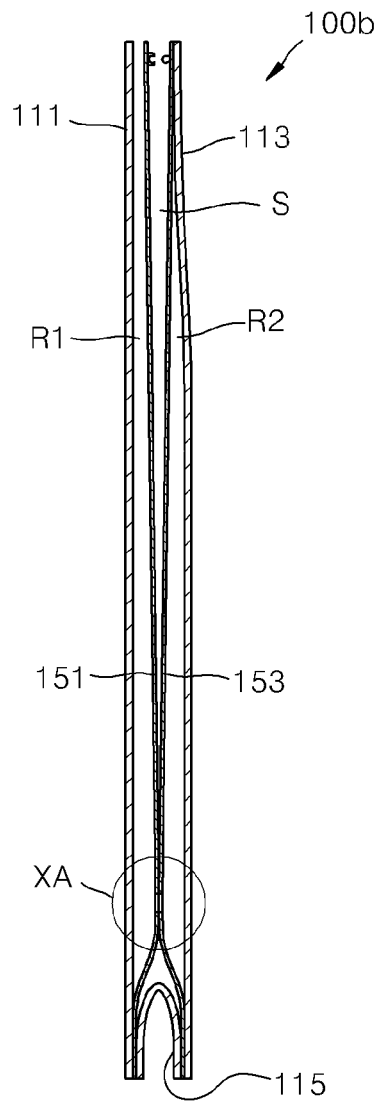
FIG. 10 is a schematic cross-sectional view of the standing pouch of FIG. 8, taken along line X-X.
Figure 10A:
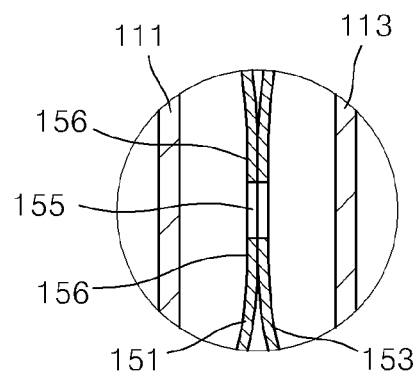
FIG. 10A is an enlarged view of XA of FIG. 10.
Figure 11:
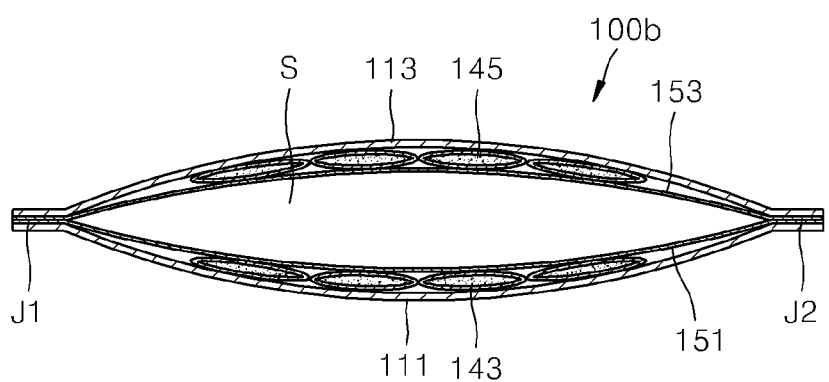
FIG. 11 is a schematic cross-sectional view of the standing pouch of FIG. 8, taken along line XI-XI.
Figure 12:
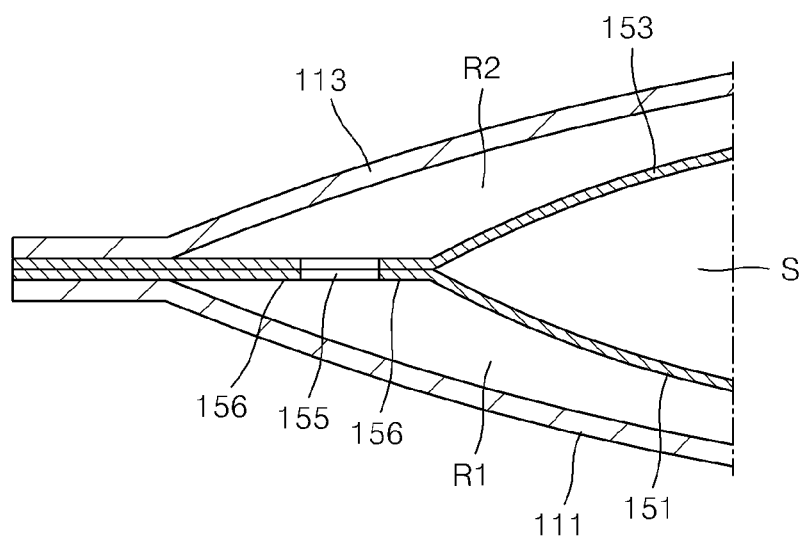
FIG. 12 is an enlarged cross-sectional view of a main part of the standing pouch of FIG. 8, taken along line XII-XII.

As shown in FIG. 9, the internal pack 150 includes a first internal part 151 disposed adjacently to a front external part 111 of the external pack 110 and a second internal part 153 disposed adjacently to a back external part 113 of the external pack 110.

The first internal part 151 is sealed with the front external part 111 of the external pack 110 at opposite lateral sides and a bottom side except for an upper side. Further, a lower end of the first internal part 151 is also sealed with a bottom external part 115. Accordingly, the first temperature control space R1 having an open upper side is formed between the first internal part 151 and the front external part 111.

A lower end of the second internal part 153 is disposed between the bottom external part 115 and the back external part 113 to be sealed with the bottom external part 115 and the back external part 113. Further, opposite lateral ends and an upper end of the second internal part 153 are sealed with the back external part 113. Accordingly, the closed second temperature control space R2 is formed between the second internal part 153 and the back external part 113.

As necessary, steam outlets C and D, as in the second exemplary embodiment, may be formed in an upper end portion of the second internal part 153 and the back external part 113.

Here, a contents accommodating space S is formed by the first internal part 151, the second internal part 153, and the bottom external part 115 of the external pack 110.

In the first exemplary embodiment, the internal pack 120 forms the contents accommodating space S, shown in FIG. 2. However, in the third exemplary embodiment, the internal pack 150 and the bottom external part 115 form the contents accommodating space S, shown in FIG. 9.

The contents accommodating space S is entirely enclosed by the external part 110 in the first exemplary embodiment, whereas the bottom external part 115 forming the contents accommodating space S is exposed to the outside in the third exemplary embodiment, so that heat loss may occur slightly more as compared with the first exemplary embodiment.

Referring to FIGS. 8, 10, 10A, and 12, the standing pouch 100b may further include a communication hole 155 formed in the first internal part 151 and the second internal part 153 to enable the first temperature control space R1 to communicate with the second temperature control space R2 and a communication hole sealing part 156 formed around the communication hole 155 and sealing the first internal part 151 and the second internal part 153.

Figure 13:
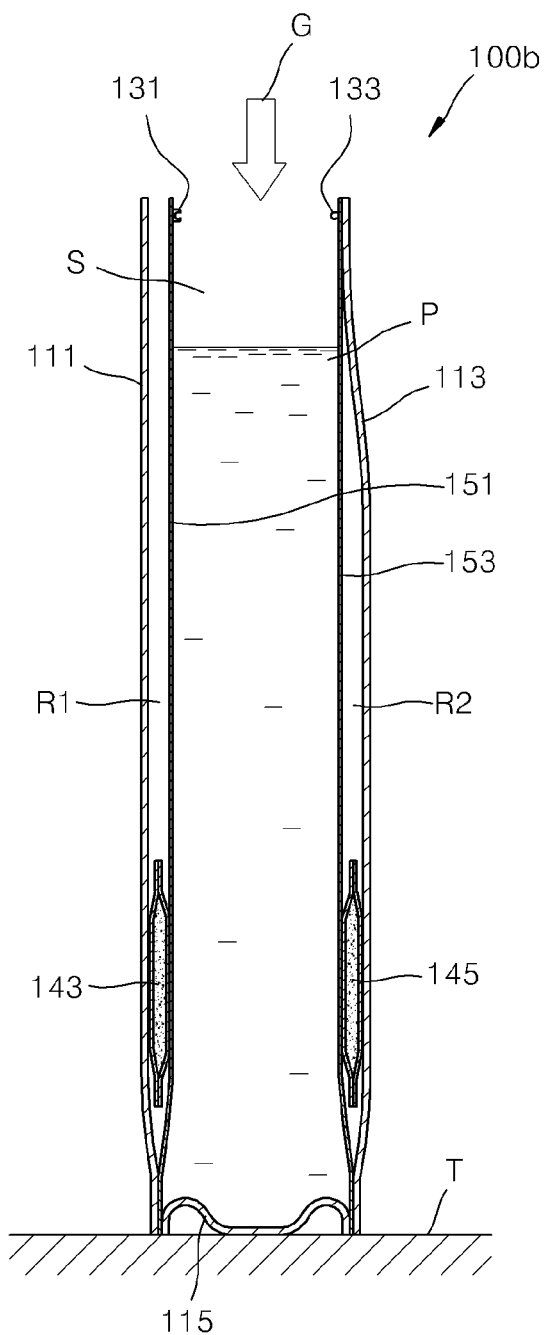
FIGS. 13 and 14 are schematic cross-sectional views illustrating use of the standing pouch of FIG. 8.
Figure 14:
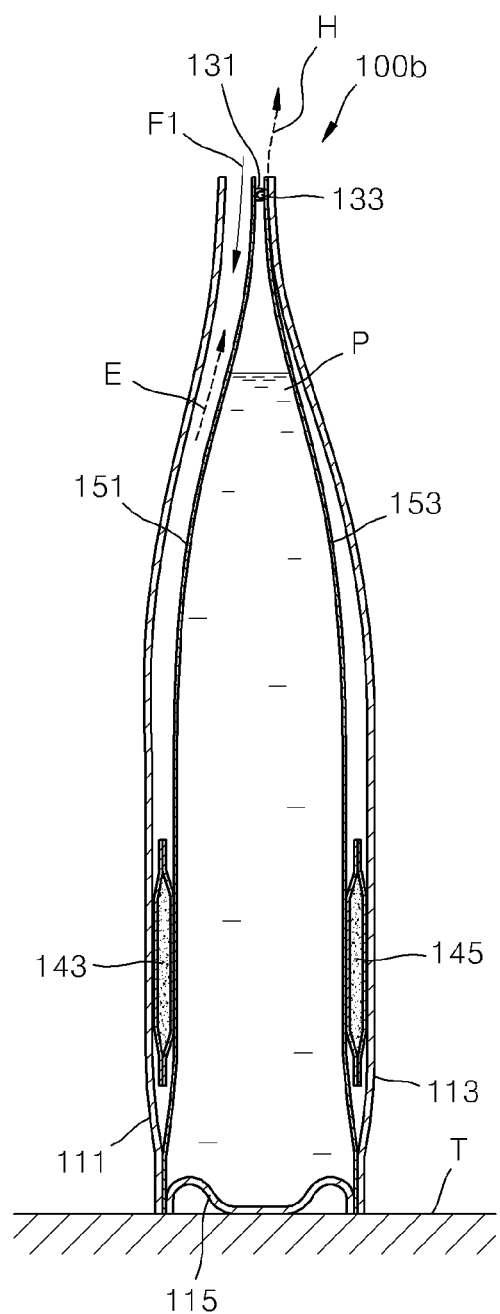

Hereinafter, a method of using the standing pouch 100b according to the third exemplary embodiment is described with reference to FIGS. 13 and 14.

Here, it is assumed that as the temperature control unit 140, a first temperature control member 143 and a second temperature control member 145 accommodated in the first temperature control space R1 and the second temperature control space R2 have a heat releasing element.

First, contents P to be heated are put into the content accommodating space S in a direction G. Accordingly, the bottom external part 115 of the external pack 110 forming the contents accommodating space S is spread downwardly by weight of the contents P. Part of the bottom external part 115 may be in contact with a bottom T on which the standing pouch 110b is placed.

The contents accommodating space S is sealed using a sealing unit 130 disposed on the first internal part 151 and the second internal part 153.

Then, a reactant liquid is put into the first temperature control space R1 in a direction F1 through an unsealed upper end between the first internal part 151 and the front external part 111.

Accordingly, the first temperature control member 143 in the first temperature control space R1 exothermically reacts with the reactant liquid to heat the contents P. Here, generated steam is discharged to the outside in a direction E through the open upper end.

Further, the reactant liquid introduced to the first temperature control space R1 flows into the second temperature control space R2 through the communication hole 155 and is in contact with the second temperature control member 145. An exothermic reaction may also occur in the second temperature control space R2 to heat the contents P. Here, generated steam may be discharged to the outside in a direction H through a steam outlet (not shown) formed in an upper end between the second internal part 153 and the back external part 113.

When the steam outlet is not formed, the steam generated in the second temperature control space R2 may be discharged to the outside through the communication hole 155 and the open upper end.

Figure 15:
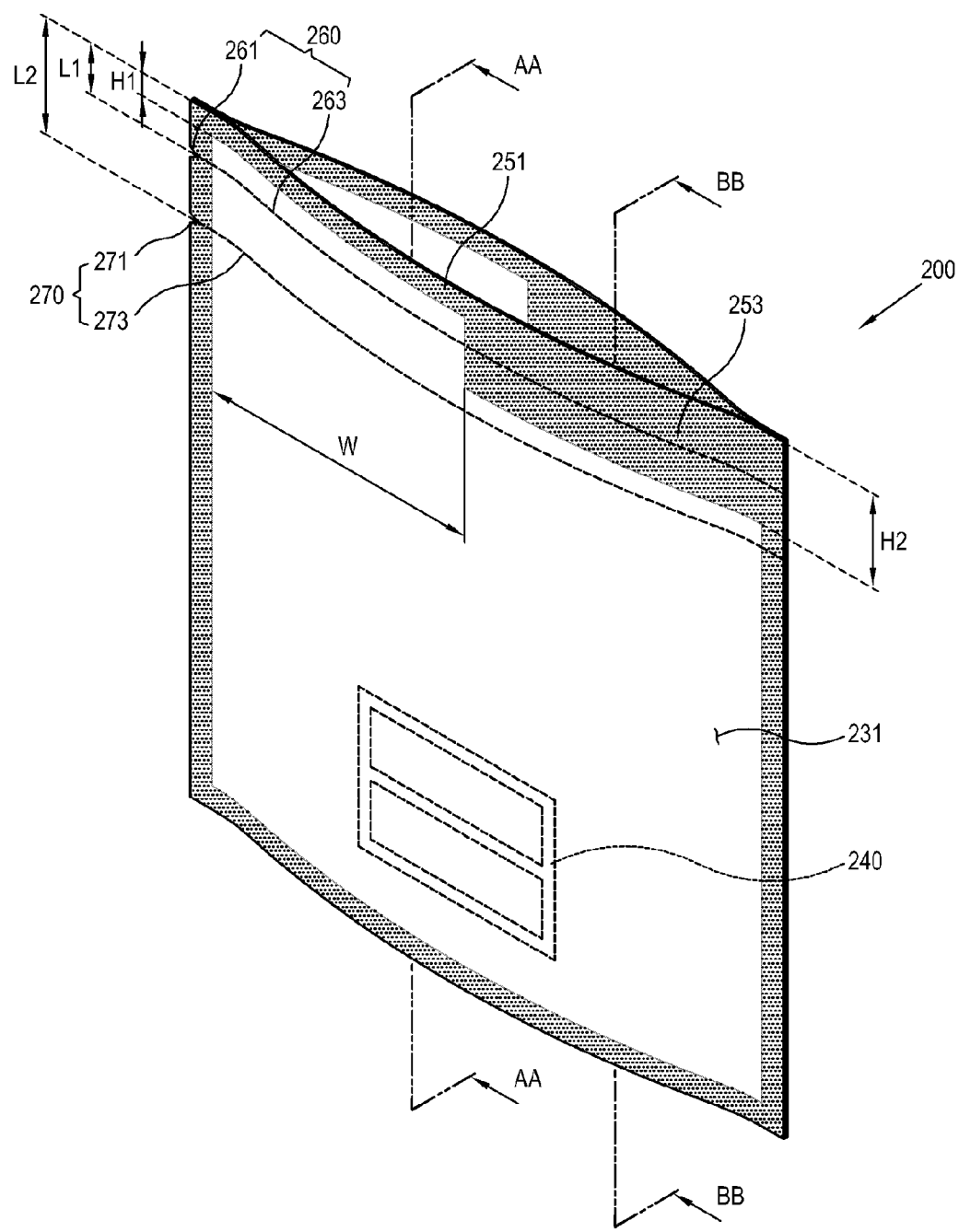
FIG. 15 is a schematic perspective view of a standing pouch according to a fourth exemplary embodiment.
Figure 16:
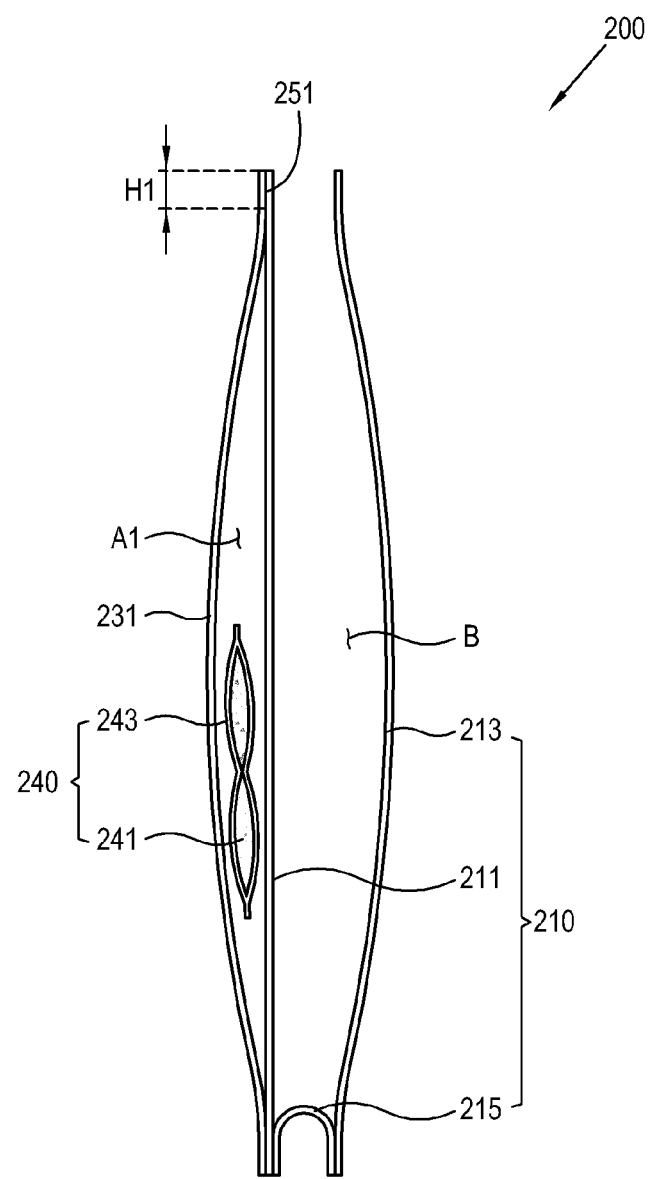
FIG. 16 is a schematic cross-sectional view of the standing pouch of FIG. 15, taken along line AA-AA.
Figure 17:
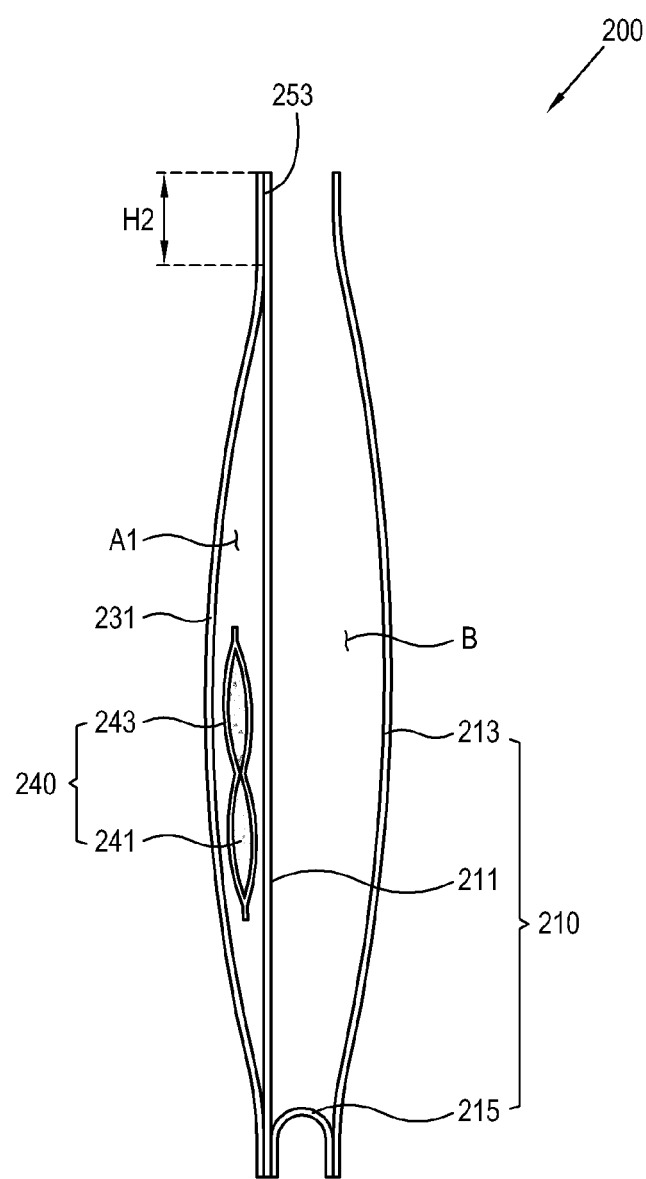
FIG. 17 is a schematic cross-sectional view of the standing pouch of FIG. 15, taken along line BB-BB.

Referring to FIGS. 15 to 17, a standing pouch 200 according to a fourth exemplary embodiment includes a first pack 210 including a first internal part 211 and a second internal part 213 to form an accommodating space B where contents are accommodated, a first external part 231 disposed to face the first internal part 211 in order to form a first temperature control space A1, and a first temperature control member 240 disposed in the first temperature control space A1. Here, the second internal part 213 is named just for convenience in order to describe a standing pouch 200a of FIG. 19 according to a fifth exemplary embodiment, and thus it is not limited that the second internal part 213 is disposed within the standing pouch 200.

Here, the first internal part 211 and the first external part 231 may be sealed to close the first temperature control space A1. In detail, the first internal part 211 and the first external part 231 are entirely sealed at upper, lower, right, and left sides. Here, sealing may be performed by a thermal fusing, an ultrasonic fusing, and any other known methods.

Here, among a sealed part of the first internal part 211 and the first external part 231, an upper sealed part 251 and 253 may have a different width H1 and H2 in a transverse direction. In detail, a width H1 of a first upper sealed part 251 may be smaller than a width H2 of a second upper sealed part 253. Accordingly, when an exothermic reaction occurs in the first temperature control space A1, generated stream further stays in the first temperature control space A1 to improve heat releasing efficiency, for which an opening corresponding to a transverse length W of the first upper sealed part 251 functions as both a part to put a reactant liquid through and a steam outlet to discharge steam generated in the exothermic reaction through.

As necessary, the width H1 of the first upper sealed part 251 may have the same as the width H2 of the second upper sealed part 253.

The first internal part 211 and the second internal part 213 may be synthetic resins, such as polyethylene (PE), polypropylene (PP), and polyethylene terephthalate (PET). In addition, the first internal part 211 and the second internal part 213 may include known flexible films of various materials. As necessary, the first internal part 211 and the second internal part 213 may be a flexible film coated with a thin metal film having a high thermal conductivity, such as aluminum.

The first external part 231 may be synthetic resins, such as PE, PP, and PET. In addition, the first external part 231 may include known flexible films of various materials.

The first temperature control member 240 may include at least one of a heat releasing element having an exothermic reaction with the reactant liquid and a heat absorbing element having an endothermic reaction with the reactant liquid. Here, the heat releasing element and the heat absorbing element may be collectively referred to as a temperature control element since the heat releasing element and the heat absorbing element respectively increase and decrease temperature of contents put in the accommodating space B.

Examples of the heat releasing element may include at least one of calcium oxide, calcium hydroxide, magnesium chloride, iron, and aluminum. In addition to the above compounds, the heat releasing element may be substituted or replaced by any other materials which have an exothermic reaction with the reactant liquid.

Here, when the heat releasing element is used as the temperature control element, the first external part 231 may be heated by the exothermic reaction, and thus an insulator may be attached to at least one of an inside and an outside of the first external part 231.

Examples of the heat absorbing element may include at least one of ammonium nitrate ($NH_4NO_3$), sodium acetate (NaOAc), and urea.

The first temperature control member 240 may include a temperature control member 241 and a nonwoven fabric 243, felt or the like to enclose the temperature control member 241. The nonwoven fabric 243 has a hygroscopic property to absorb the reactant liquid, thereby easing a chemical reaction of the reactant liquid with the heat releasing element or the heat absorbing element accommodated therein. As necessary, the nonwoven fabric 243 may be omitted. Further, the nonwoven fabric 243 may be substituted or replaced by a different material having a hygroscopic property.

The first pack 210 may further include a bottom internal part 215 disposed between the first internal part 211 and the second internal part 213 to be coupled with a lower part of the first internal part 211 and a lower part of the second internal part 213. The bottom internal part 215 spaces the first internal part 211 from the second internal part 213 at the lower parts so that the pouch 200 stands.

Further, the standing pouch 200 may further include a first ripping part 260 formed on at least one of the first internal part 211, the second internal part 213, and the first external part 231 to rip the first internal part 211 and the first external part 231 in the transverse direction so that the first temperature control space A1 is open.

The first ripping part 260 includes a first notch 261 formed on the first external part 231 and a first ripping line 263 extending from the first notch 261 to ease ripping of the first internal part 211 and the first external part 231 in the transverse direction. Here, as necessary, any one of the first notch 261 and the first ripping line 263 may be omitted. The first ripping line 263 may further include a fine ripping groove (not shown) formed in the transverse direction. Accordingly, the user rips the first internal part 211 and the first external part 231 along the first ripping line 263 to open the first temperature control space A1.

Here, the first ripping line 263 enables easy ripping of at least one of the first external part 231, the first internal part 211, and the second internal part 213 along a line corresponding to the first ripping line 263 when the first notch 251 is ripped. It is preferable to prevent foreign materials from flowing into the first temperature control space A1 through the ripping groove or to prevent contents T to be accommodated in the accommodating space B from leaking out through the ripping groove.

Here, as necessary, when the standing pouch 200 is ripped using the first ripping part 260, the accommodating space B may also be open along with the first temperature control space A1, which is possible by properly adjusting a width (see H3 FIG. 18B) of a third upper sealed part 252 of the first internal part 211 and the second internal part 213.

The first ripping line 263 may be formed only on the first internal part 211 and the first external part 231 to be ripped. As necessary, the first ripping line 263 may be formed on the second internal part 213.

Further, the standing pouch 200 may further include a second ripping part 270 formed on at least one of the first internal part 211, the second internal part 213, and the first external part 231 to rip the first internal part 211 and the second internal part 213 in the transverse direction so that the accommodating space B is open. Here, the first internal part 211 and the second internal part 213 may be sealed, so that the first internal part 211 and the second internal part 213 are kept sealed when the first internal part 211 and the first external part 231 are ripped in the transverse direction using the first ripping part 260. Accordingly, unless the user rips the standing pouch 200 using the second ripping part 270, the first internal part 211 and the second internal part 213 are kept sealed, so that inside retort food may be stored sanitarily.

The second ripping part 270 includes a second notch 271 formed on the first external part 231 and a second ripping line 273 extending from the second notch 271 to ease ripping of the first internal part 211 and the second internal part 213 in the transverse direction. Here, the second ripping line 273 may also be formed on the first external part 231 so that the first external part 231 is ripped along with the first and second internal parts 211 and 213 when ripping along the second ripping line 273.

As necessary, any one of the second notch 271 and the second ripping line 273 may be omitted. The second ripping line 273 may further include a fine ripping groove (not shown) formed in the transverse direction. Accordingly, the user rips the first internal part 211 and the second internal part 213 along the second ripping line 273 to open the accommodating space B.

The second ripping part 270 may be omitted as necessary. For example, as described above, when the standing pouch 200 is ripped using the first ripping part 260 to open both the first temperature control space A1 and the accommodating space B, the second ripping part 270 may be omitted.

Figure 18A:
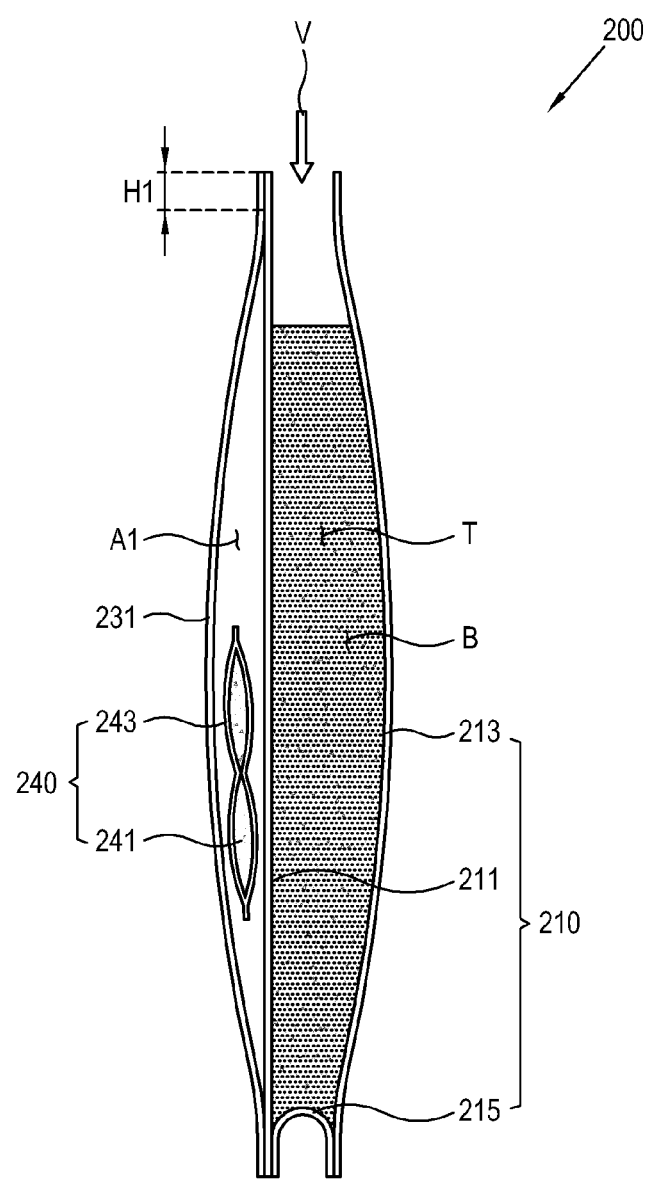
FIGS. 18A and 18B are schematic cross-sectional view illustrating a process of packaging contents in the standing pouch of FIG. 15.

Hereinafter, a method of packaging retort food using the standing pouch 200 according to the fourth exemplary embodiment is described with reference to FIGS. 18A and 18B.

First, the standing pouch 200 is prepared. Here, before the retort food are put into, the first internal part 211 and the second internal part 213 may not be sealed at an upper side so that the accommodating space B is open.

Here, since the first temperature control space A1 is sealed, infiltration of foreign materials or occurrence of an unexpected temperature control reaction, such as exothermic or endothermic reactions, may be prevented while carrying the standing pouch 200 before putting the retort food T.

Then, the retort food T is put into the accommodating space B between the first internal part 211 and the second internal part 213 of the standing pouch 200. Here, the retort food T may include curry, cooked rice, soup, or the like, for example.

The first internal part 211 and the second internal part 213 are sealed to close the accommodating space B.

Here, the width H3 of the third upper sealed part 252 of the first internal part 211 and the second internal part 213 may be greater than a width H1 of a first upper sealed part 251 of the first external part 231 and the first internal part 211. A distance H3 from an upper end of the pouch 200 to a lower end of the third upper sealed part 252 is longer than a distance H1 from the upper end of the pouch 200 to a lower end of the first upper sealed part 251, and is shorter than a distance H2 from the upper end of the pouch 200 to a lower end of the second upper sealed part 253. That is, to satisfy H1<H3<H2, the first upper sealed part 251, the second upper sealed part 253, and the third upper sealed part 252 may be formed.

Further, a distance L1 from the upper end of the pouch 200 to the first ripping line 263 of the first ripping part 260 is longer than the distance H1 from the upper end of the pouch 200 to the lower end of the first upper sealed part 251, and is shorter than the distance H3 from the upper end of the pouch 200 to the lower end of the third upper sealed part 252. That is, to satisfy H1<L1<H3<H2, the first ripping part 260 may be formed.

In addition, a distance L2 from the upper end of the pouch 200 to the second ripping line 273 of the second ripping part 270 is longer than the distance H2 from the upper end of the pouch 200 to the lower end of the second upper sealed part 253. That is, to satisfy L2>H2, the second ripping part 270 may be formed.

Figure 18B:
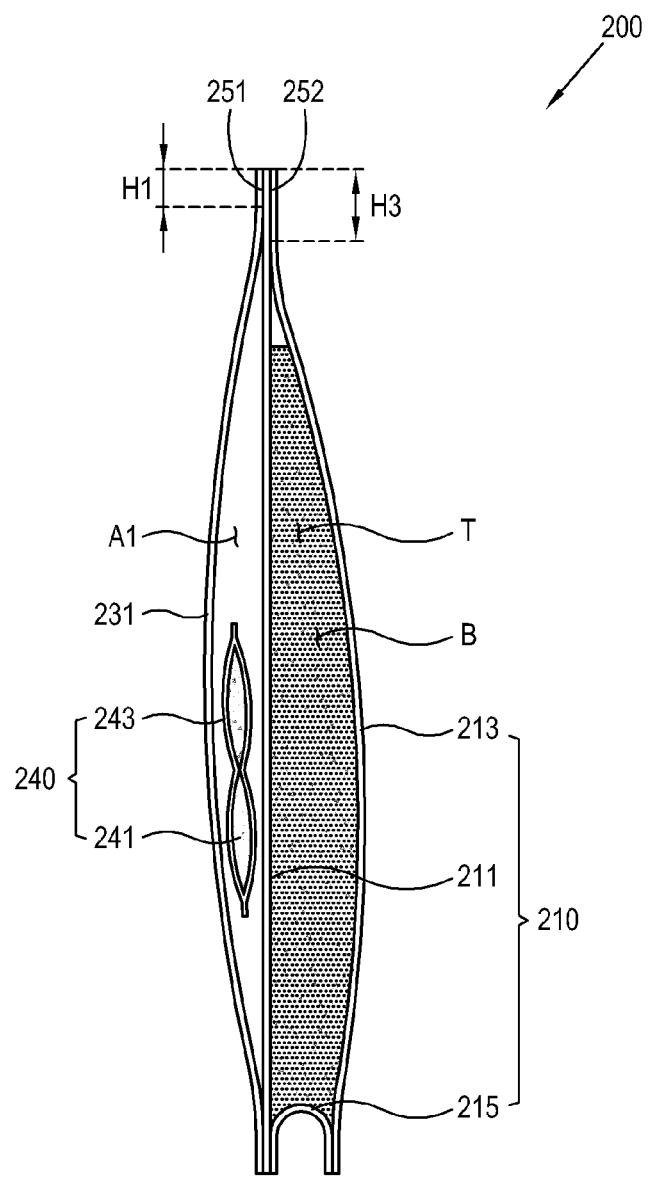

Accordingly, as shown in FIG. 18B, the retort food T may be packaged in the standing pouch 200.

Subsequently, the packaging standing pouch 200 is sterilized.

Here, the sterilization may be achieved by spraying high-temperature and high-pressure steam to the standing pouch 200 or warming up the standing pouch 200 in a double boiler with hot water. Further, various known sterilization processes may be used. Here, a sterilization process may be performed to sterilize the accommodating space B of the standing pouch 200 before the retort food T is put.

Hereinafter, a method of taking retort food T using the standing pouch 200 packaging the retort food T is described with reference to FIGS. 15, 18C and 18D.

The first ripping part 260 of the standing pouch 200 is cut.

Figure 18C:
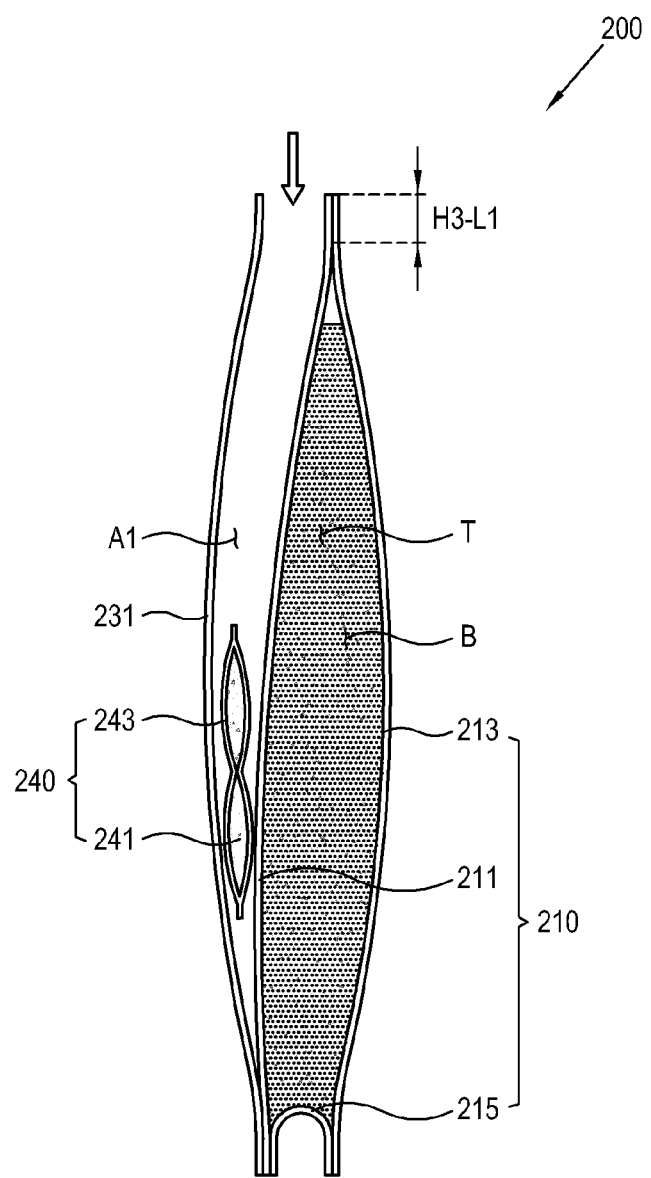
FIGS. 18C and 18D are schematic cross-sectional view illustrating use of the standing pouch of FIG. 15 which is packaged with the contents.

Accordingly, as shown in FIG. 18C, the first temperature control space A1 is open upwards. An open portion corresponds to the length W of the first upper sealed part 251 in the transverse direction shown in FIG. 15.

Then, the user pours a reactant liquid V, for example, water, into the first temperature control space A1 to exothermically or endothermically react with the first temperature control member 240 provided in the first temperature control space A1.

Accordingly, the retort food T is heated or cooled by the exothermic or endothermic reaction occurring in the first temperature control space A1.

Here, even though the first ripping part 260 is cut, part of the third upper sealed part 252 of the first internal part 211 and the second internal part 213 is left by a width, which is H3−L1, so that the retort food T is kept sealed.

Then, the standing pouch 200 is cut using the second ripping part 260 of FIG. 15.

Figure 18D:
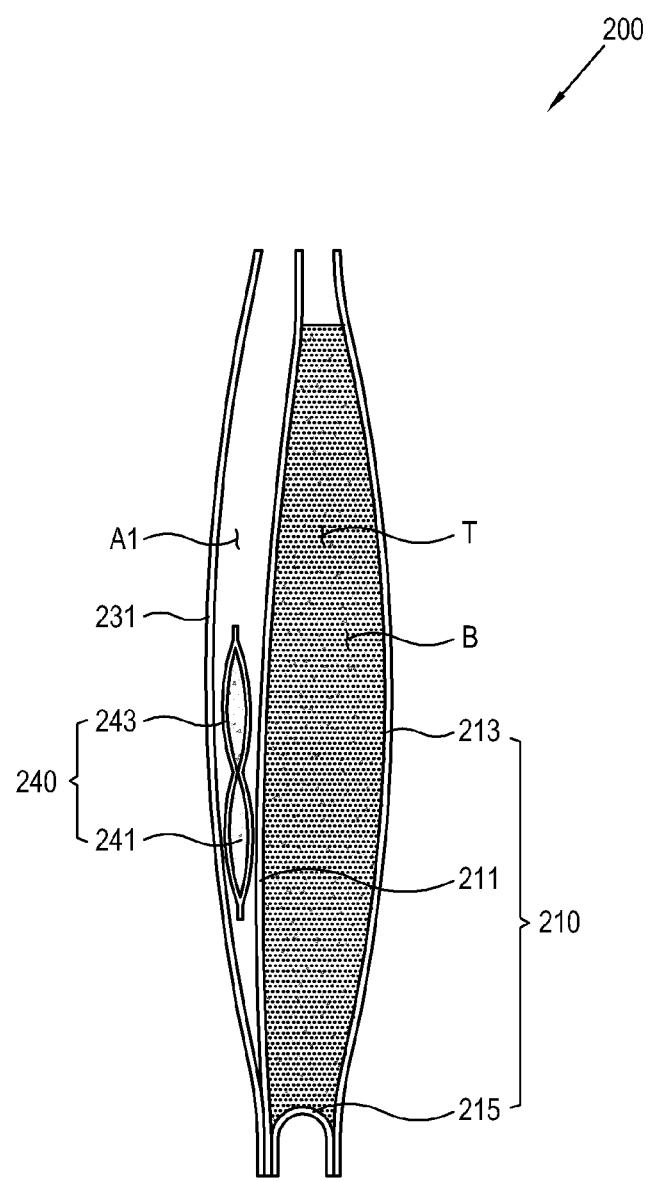

Accordingly, as shown in FIG. 18D, the first internal part 211 and the second internal part 213 which are sealed become open at an upper side. Thus, the user may take the heated or cooled retort food T.

Here, the retort food T is described as an illustrative example of the contents accommodated in the accommodating space B, but the contents may include food, such as soup, curry and cooked rice, cosmetic mask packs, and the like which increase in usefulness when heated or cooled.

Further, the standing pouch 200 may be marketed, without contents being kept in the accommodating space B or with the first internal part 211 and the second internal part 213 being open at the upper side. In this instance, the user puts contents in the accommodating space B and cuts the first ripping part 260 to heat and cool the put contents.

Since the standing pouch 200 is distributed with the first temperature control space A1 sealed, an unexpected exothermic or endothermic reaction is prevented from occurring, and difficulties of distribution due to an increase in weight and volume of a reactant liquid may be eased.

Referring to FIGS. 19 to 22, a standing pouch 200a according to a fifth exemplary embodiment includes a first pack 210 including a first internal part 211 and a second internal part to form an accommodating space B where contents are accommodated, a first external part 231 disposed to face the first internal part 211 in order to form a first temperature control space A1, a second external part 233 disposed to face the second internal part 213 in order to form a second temperature control space A2, and a first temperature control member 240 and a second temperature control member 290 respectively disposed in the first temperature control space A1 and the second temperature control space A2.

The first internal part 211 and the first external part 231, and the second internal part 213 and the second external part 233 are sealed to close the first temperature control space A1 and the second temperature control space A2, respectively.

In the fifth exemplary embodiment, the temperature control spaces A1 and A2 are disposed on opposite sides with the accommodating space B to accommodate contents being disposed therebetween, thereby heating or cooling the contents more quickly. As necessary, an exothermic reaction and an endothermic reaction are allowed to occur respectively in the first temperature control space A1 and the second temperature control space A2, so that the contents are independently heated and cooled in front and back.

Figure 19:
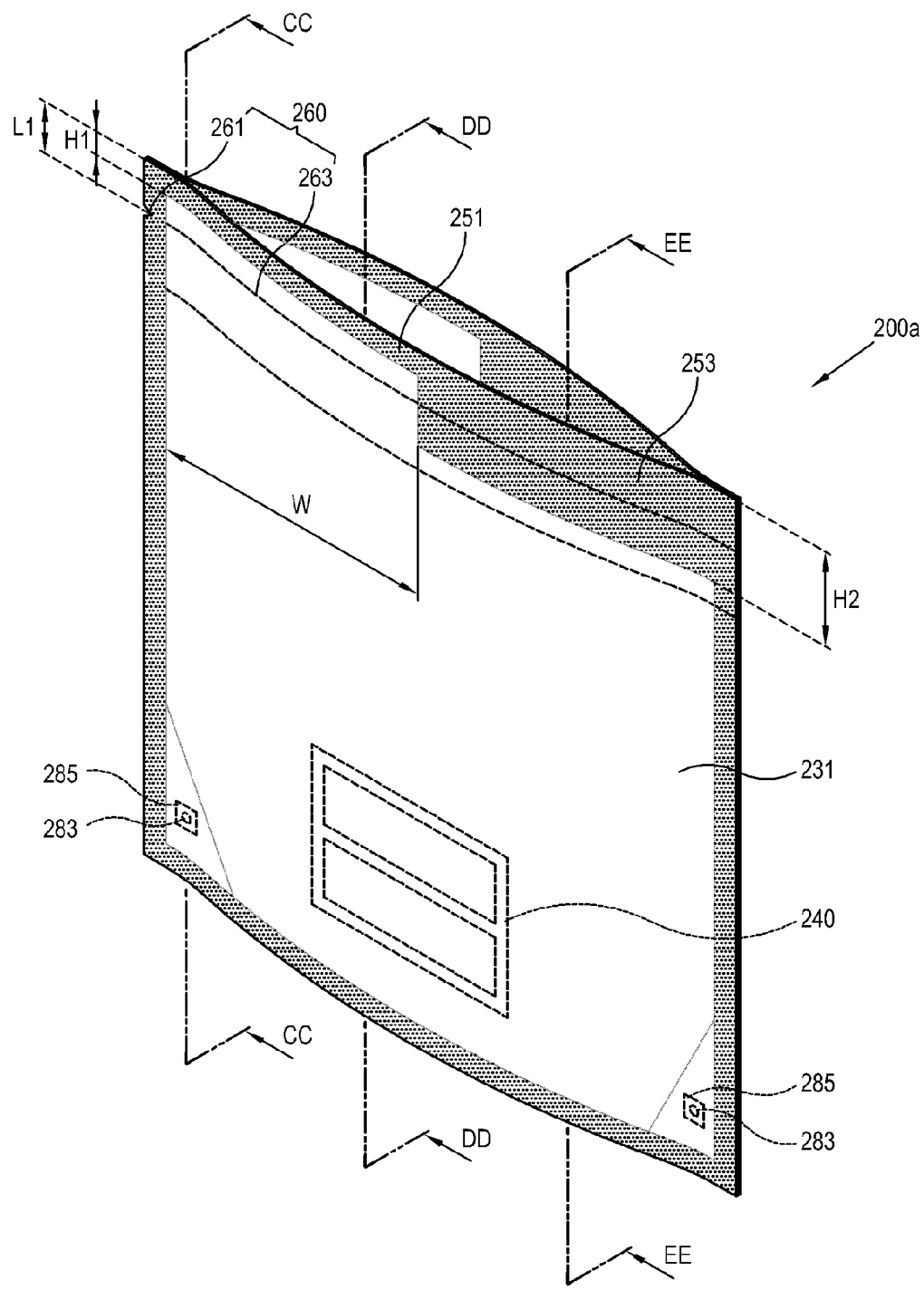
FIG. 19 is a schematic perspective view of a standing pouch according to a fifth exemplary embodiment.
Figure 20:
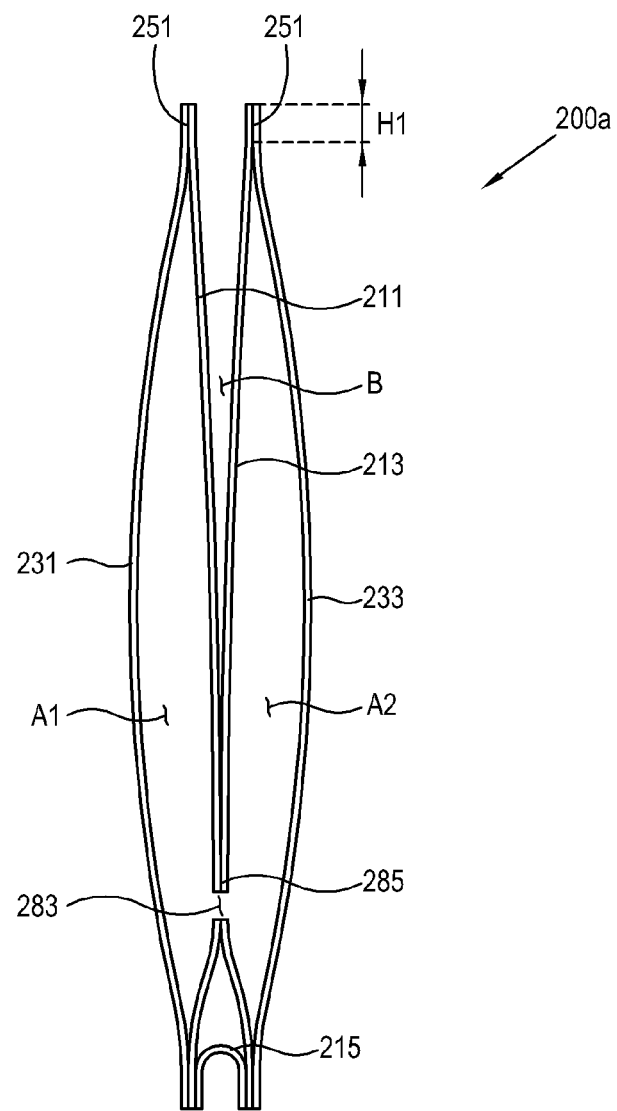
FIG. 20 is a schematic cross-sectional view of the standing pouch of FIG. 19, taken along line CC-CC.

Referring to FIGS. 19 and 20, the standing pouch 200a may further include a communication hole 283 formed in the first internal part 211 and the second internal part 213 to enable the first temperature control space A1 to communicate with the second temperature control space A2, and a communication hole sealing part 285 formed around the communication hole 283 and sealing the first internal part 211 and the second internal part 213. Accordingly, a reactant liquid introduced into any one of the first temperature control space A1 and the second temperature control space A2 flows into the other one through the communication hole 283. Thus, an exothermic reaction or an endothermic reaction occurs almost simultaneously in the first temperature control space A1 and the second temperature control space A2.

Similar to the standing pouch 200 of the fourth exemplary embodiment, in the standing pouch 200a of the fifth exemplary embodiment, the first external part 231 and the first internal part 211 are sealed at an upper side in a transverse direction of the standing pouch 200a to form a first upper sealed part 251 and a second upper sealed part 253. Here, a width H1 of the first upper sealed part 251 may be smaller than a width H2 of the second upper sealed part 253. Further, a transverse length W of the first upper sealed part 251 is relatively shorter than a transverse length of the second upper sealed part 253.

Figure 21:
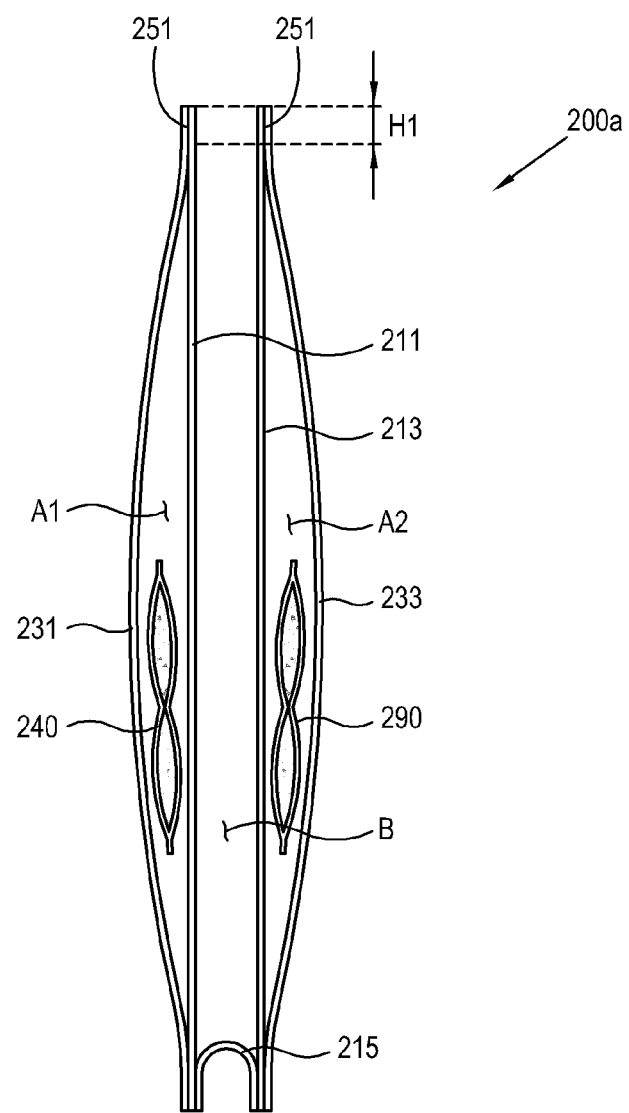
FIG. 21 is a schematic cross-sectional view of the standing pouch of FIG. 19, taken along line DD-DD.
Figure 22:
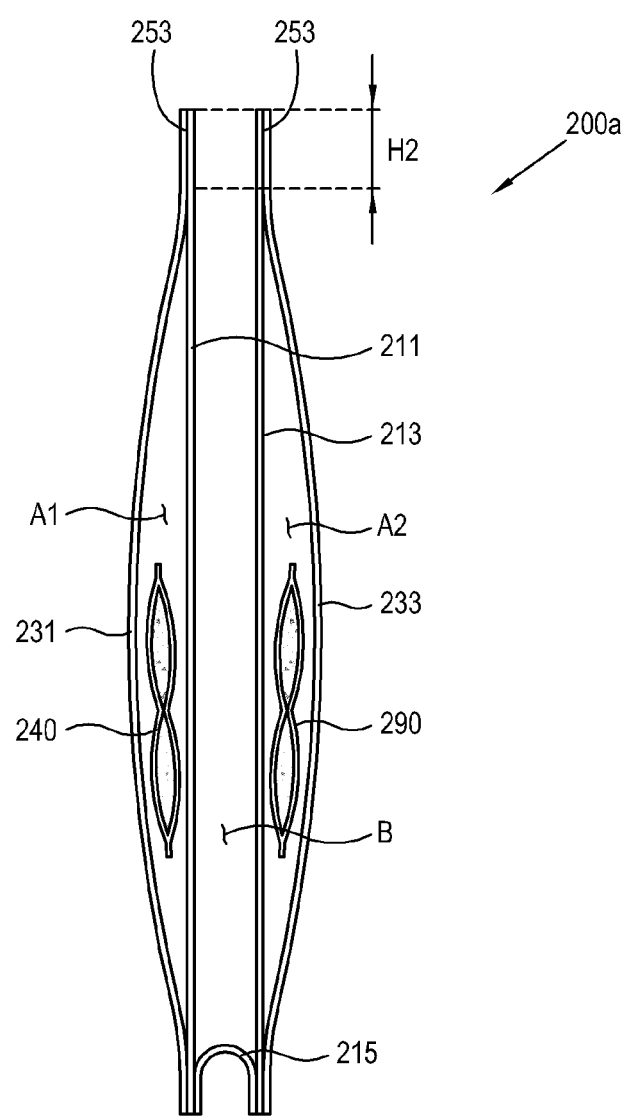
FIG. 22 is a schematic cross-sectional view of the standing pouch of FIG. 19, taken along line EE-EE.

As shown FIGS. 21 and 22, the second external part 233 and the second internal part 213 are sealed in the same manner as the first upper sealed part 251 and the second upper sealed part 253 between the first external part 231 and the first internal part 211. As necessary, the second external part 233 and the second internal part 213 may be sealed in a different manner from the first external part 231 and the first internal part 211.

Here, a correlation between distances H1, H2, H3, and L1 from an upper end of the pouch 200a to each of the first upper sealed part 251, the second upper sealed part 253, a third upper sealed part 257, and a first ripping part 260 is simply expressed as H1<H4<L1<H2.

Figure 23A:
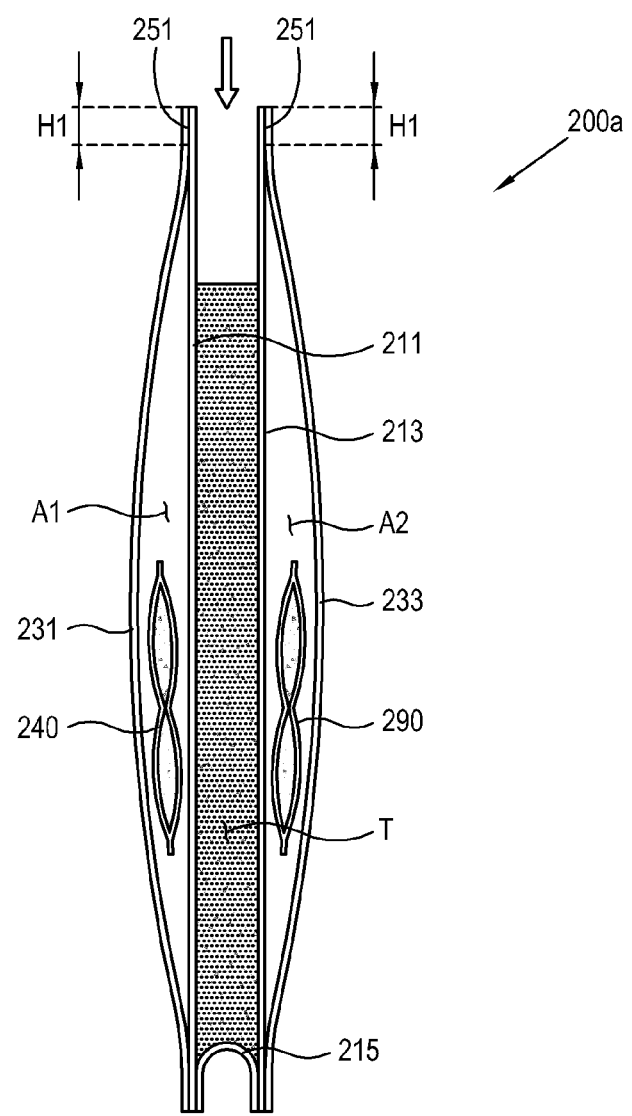
FIGS. 23A and 23B are schematic cross-sectional view illustrating a process of packaging contents in the standing pouch of FIG. 19.
Figure 23B:
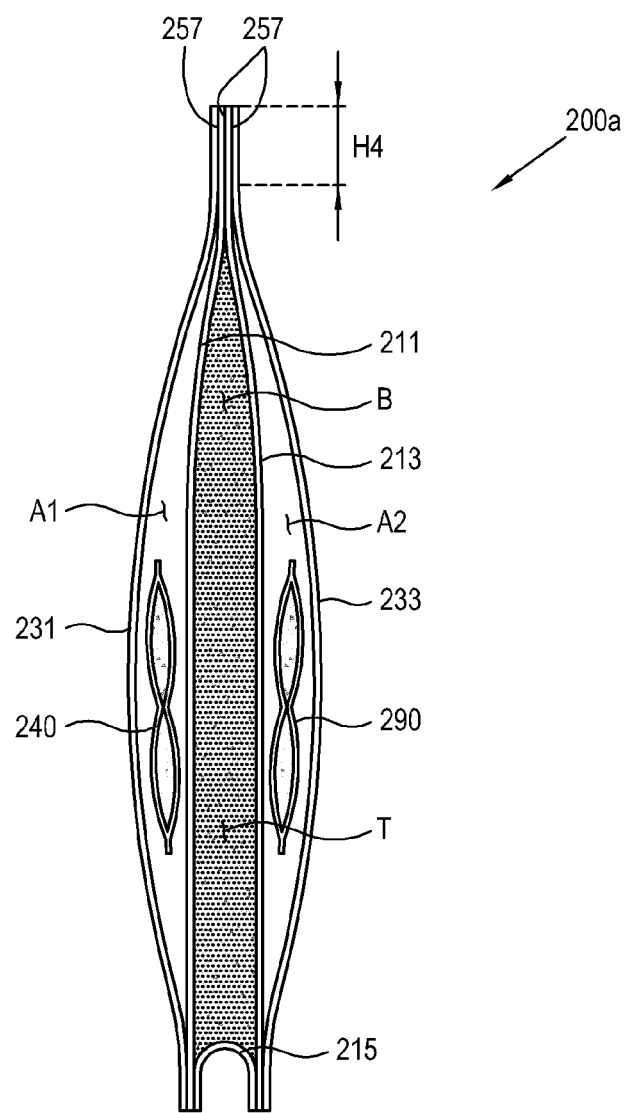

That is, the distance H4 from the upper end of the pouch 200a to the third upper sealed part 257 of FIG. 23B is longer than the distance H1 from the upper end of the pouch 200a to the first upper sealed part 251, and is shorter than the distance H2 from the upper end of the pouch 200a to the second upper sealed part 253.

The third upper sealed part 257 is formed to seal the accommodating space B after contents, such as retort food T, are put into the accommodating space B between the first internal part 211 and the second internal part 213. Only the first and second internal parts 211 and 213 may be sealed, or the first and second external parts 231 and 233 may be sealed along with the first and second internal parts 211 and 213 as necessary. In the fifth exemplary embodiment, the first and second external parts 231 and 233 are also sealed together.

Here, the first upper sealed part 251 and the second upper sealed part 253 may be sealed before the contents, such as the retort food T, are put into the accommodating space B, as shown in FIG. 23A. The third upper sealed part 257 is sealed to close the accommodating space B in a process of packaging the contents, such as the retort food T.

Further, the distance H4 from the upper end of the pouch 200a to the third upper sealed part 257 of FIG. 23b is shorter than the distance L1 from the upper end of the pouch 200a to the first ripping part 260, particularly a first ripping line 263.

Also, the distance L1 from the upper end of the pouch 200a to the first ripping part 260 is shorter than the distance H2 from the upper end of the pouch 200a to the second upper sealed part 253. Accordingly, when the pouch 200a is cut using the first ripping part 260, a portion between the first external part 231 and the first internal part 211 corresponding to a transverse portion W of the first upper sealed part 251, that is, the first temperature control space A1, is open. The second temperature control space A2 may be also open. For reference, as compared with the fourth exemplary embodiment, the standing pouch 200a of the fifth exemplary embodiment does not include a second ripping part 270.

Hereinafter, a method of packaging retort food T using the standing pouch 200a is described with reference to FIGS. 23A and 23B.

First, the standing pouch 200a of the fifth exemplary embodiment is prepared.

Then, as shown in FIG. 23A, the retort food T is put into the accommodating space B of the standing pouch 200a.

The first internal part 211 and the second internal part 213 keeping the retort food T are sealed at an upper side to form the third upper sealed part 257. Here, the third upper sealed part 257 may be formed not only between the first internal part 211 and the second internal part 213 but also between the first internal part 211 and the first external part 231 and between the second internal part 213 and the second external part 233.

Accordingly, as shown in FIG. 23B, the standing pouch 200a having the sealed accommodating space B is obtained.

Then, the standing pouch 200a accommodating the retort food T is sterilized.

Next, a method of taking the retort food T put in the sterilized standing pouch 200a is described with reference to FIGS. 19 and 23C.

The user tears the standing pouch 200 by cutting the first ripping part 260 shown in FIG. 19.

Figure 23C:
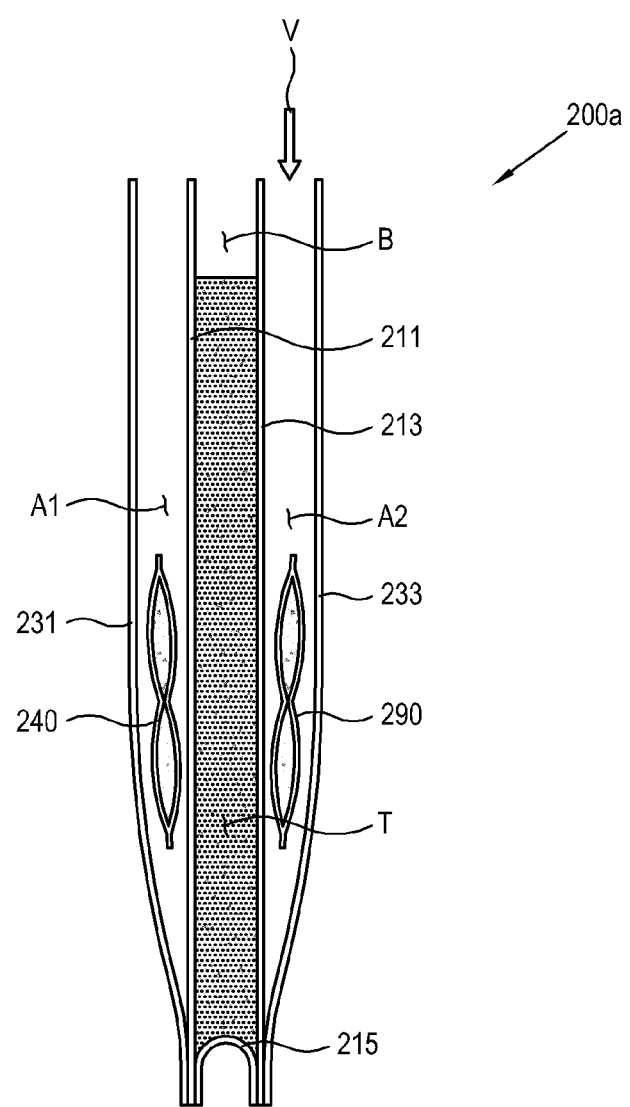
FIG. 23C is a schematic cross-sectional view illustrating use of the standing pouch of FIG. 19 which is packaged with the contents.

Accordingly, as shown in FIG. 23C, the first temperature control space A1, the second temperature control space A2, and the accommodating space B are simultaneously open. Since the distance H4 from the upper end of the pouch 200a to the third upper sealed part 257 of FIG. 23B. is shorter than the distance L1 from the upper end of the pouch 200a to the first ripping line 263, described above, the accommodating space B is also open by cutting the first ripping part 260.

Then, the user pours a reactant liquid V of FIG. 23C, for example, water, into any one of the first temperature control space A1 and the second temperature control space A2. The reactant liquid flows into the other temperature control space through the communication hole 283, so that an exothermic or endothermic reaction occurs in the first temperature control space A1 and the second temperature control space A2.

Then, the user may take the retort food T heated or cooled by the exothermic or endothermic reaction.

Here, when a heat releasing element is used as the temperature control elements, the first external part 231 and the second external part 233 may be heated by the exothermic reaction, and thus an insulator may be attached to at least one of an inside and an outside of the first external part 231 and the second external part 233.

Figure 24:
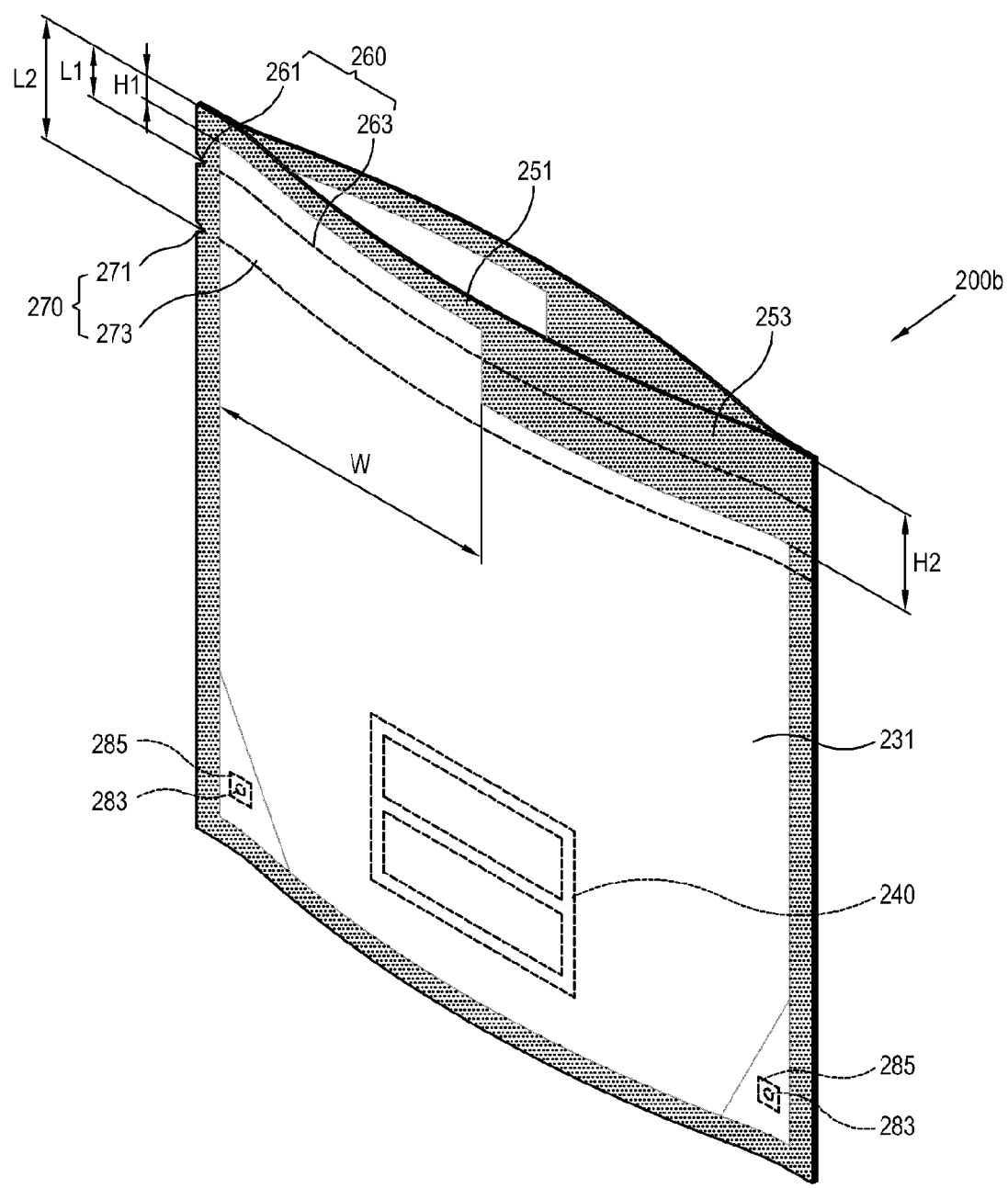
FIG. 24 is a schematic perspective view of a standing pouch according to a sixth exemplary embodiment.
Figure 25:
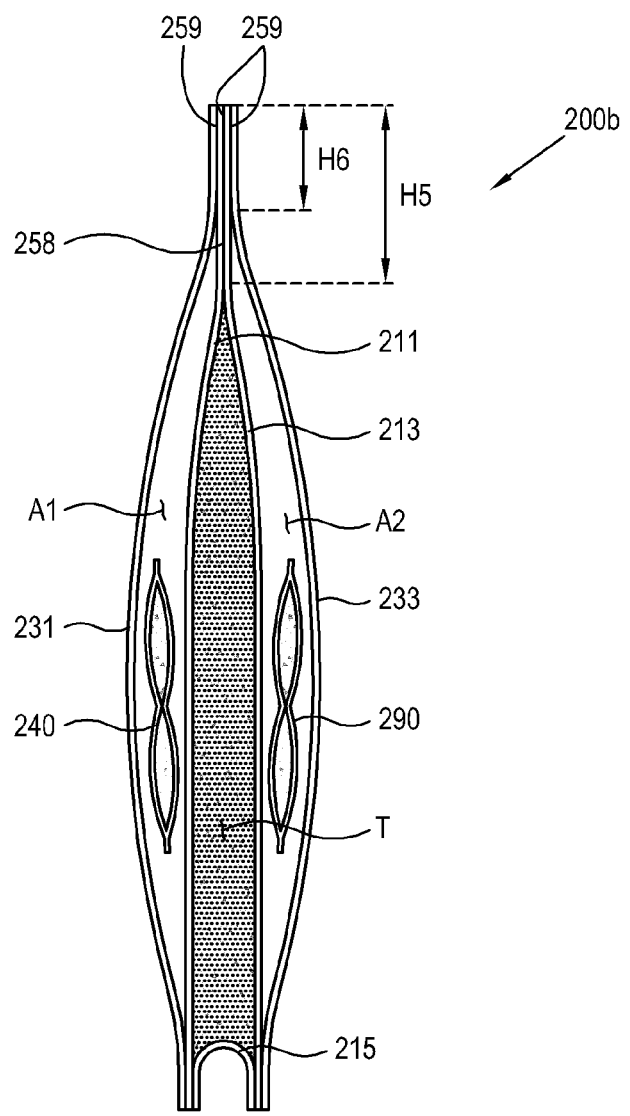
FIG. 25 is a schematic cross-sectional view illustrating a process of packaging contents in the standing pouch of FIG. 24.

Referring to FIGS. 24 and 25, a standing pouch 200b according to a sixth exemplary embodiment further includes a second ripping part 270 as compared with the standing pouch 200a according to the fifth exemplary embodiment.

As described in the fourth exemplary embodiment, the second ripping part 270 includes a second notch 271 formed on a first external part 231 and a second ripping line 273 extending from the second notch 271 to ease transverse ripping of a first internal part 211 and a second internal part 213. Here, the second ripping line 273 may also be formed on the first external part 231 so that the first external part 231 is ripped along with the first and second internal parts 211 and 213 when ripping along the second ripping line 273.

As necessary, any one of the second notch 271 and the second ripping line 273 may be omitted. The second ripping line 273 may further include a fine ripping groove (not shown) formed in the transverse direction. Accordingly, the user rips the standing pouch 200b along the second ripping line 273 to open the accommodating space B. In other words, the first ripping part 260 is to open at least one of the first and second temperature control spaces A1 and A2, and the second ripping part 270 is to open the accommodating space B.

Further, as compared with the standing pouch 200a of the fifth exemplary embodiment, the standing pouch 200b of the sixth exemplary embodiment includes a third upper sealed part 258 having a different width H5, the third upper sealed part 258 sealing the first internal part 211 and the second internal part 213 to close an accommodating space B.

The width H5 of the third upper sealed part 258 of the first and second internal parts 211 and 213, that is, a distance from an upper end of the pouch 200b to a lower end of the third upper sealed part 258, is shorter than a longitudinal distance L2 from the upper end of the pouch 200b to the second ripping line 273, and is longer than a distance H2 from the upper end of the pouch 200 to a lower end of a second upper sealed part 253. That is, a relation of H2<H5<L2 is established.

As necessary, the third upper sealed part 258 may further include an additional sealed part 259 in order to further entirely seal the first external part 231 and the first internal part 211, and the second internal part 213 and the second external part 233 in a width direction of the pouch 200b. Here, a longitudinal distance H6 from the upper end of the pouch 200b to the additional sealed part 259 is longer than a distant H1 form the upper end of the pouch 200b to a lower end of a first upper sealed part 251, and is shorter than the distance H2 from the upper end of the pouch 200b to the lower end of the second upper sealed part 253. Further, the longitudinal distance H6 from the upper end of the pouch 200b to the additional sealed part 259 is shorter than a distance L1 from the upper end of the pouch 200b to the first ripping line 263. That is, a relation of H1<H6<L1<H2 is established.

As necessary, the additional sealed part 259 may be omitted. In this instance, the second upper sealed part 253 keeps an area of the additional sealed part 259.

Hereinafter, a method of packaging contents, such as retort food T, using the standing pouch 200b of the sixth exemplary embodiment is described with reference to FIGS. 24 and 25.

First, the standing pouch 200b shown in FIG. 24 is prepared.

Here, the accommodating space B is kept open before putting the contents. As necessary, before putting the contents, the accommodating space B of the standing pouch 200b may be washed with hot water to eliminate foreign materials or bacteria which exist in the accommodating space B.

In this instance, since the first and second temperature control spaces A1 and A2 are closed, infiltration of foreign materials into the spaces A1 and A2 may be prevented even though the standing pouch 200b is washed.

Then, the contents to be heated or cooled, for example, the retort food T, are put into the accommodating space B of the standing pouch 200b.

The first internal part 211 and the second internal part 213 are sealed at an upper side to form the third upper sealed part 258. Here, the first external part 231 and the first internal part 211, and the second internal part 213 and the second external part 233 are sealed to form the additional sealed part 259. Accordingly, the accommodating space B is sealed.

Then, the standing pouch 200b having the sealed accommodating space B is sterilized.

Hereinafter, a method of taking retort food T packaged in the standing pouch 200b is described with reference to FIGS. 24 and 26.

First, an upper side of the standing pouch 200b is cut using the first ripping part 260, shown in FIG. 24. Accordingly, at least one of the first temperature control space A1 and the second temperature control space A2 is open. Here, an open portion of the first and second temperature spaces A1 and A2 corresponds to a portion W of the first upper sealed part 251, and the remaining portion corresponding to the second upper sealed part 253 is kept sealed.

Here, the accommodating space B accommodating the retort food T is kept sealed since the third upper sealed part 258 remains.

Figure 26:
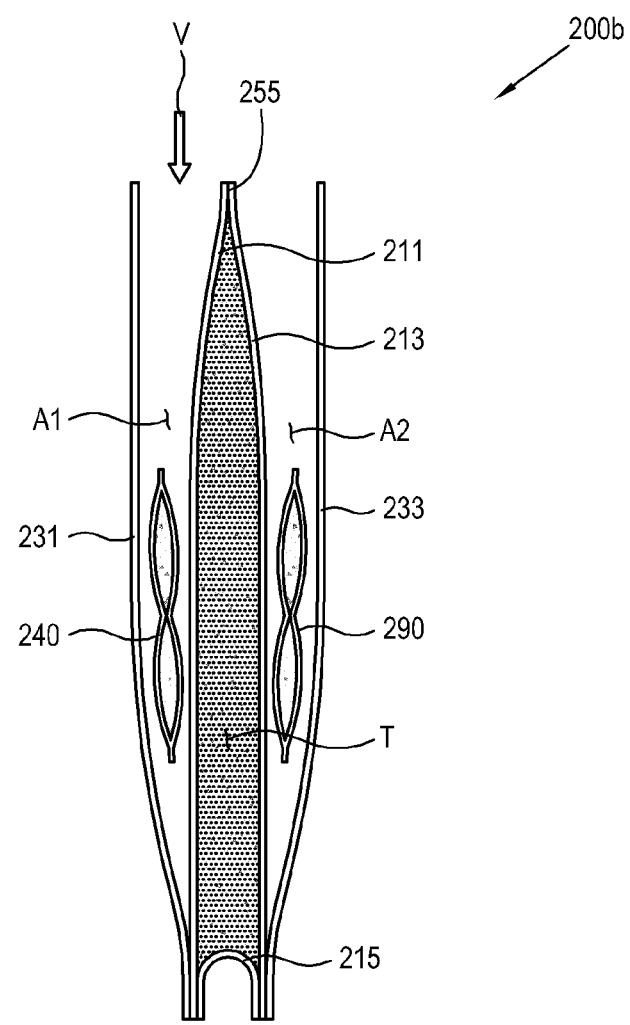
FIG. 26 is a schematic cross-sectional view illustrating use of the standing pouch of FIG. 24 which is packaged with the contents.

Next, a reactant liquid V of FIG. 26, for example, water, is poured into any open one of the first temperature control space A1 and the second temperature control space A2. The reactant liquid introduced to the one temperature control space flows into the other temperature control space through a communication hole 283, so that an exothermic or endothermic reaction occurs in the first temperature control space A1 and the second temperature control space A2.

After time passes enough to heat or cool the retort food T accommodated in the accommodating space B, the standing pouch 200b is cut using the second ripping part 270.

Here, since a portion 255 of the third upper sealed part 258 is left after cutting the first ripping part 260, the accommodating space B is kept sealed until the second ripping part 270 is cut. The pouch 200b is ripped by cutting the second ripping part 270 to open the sealed accommodating space B, and thus the user takes the retort food T accommodated in the accommodating space B.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A standing pouch comprising:
 a first pack which comprises a first internal part and a second internal part;
 an accommodating space formed between the first internal part and the second internal part and configured to received and contain contents therein;
 a first external part which is disposed to face the first internal part to form a first temperature control space between the first external part and the first internal part; and
 a first temperature control member which is disposed in the first temperature control space,
 a first upper sealed part configured to seal an upper end of the first internal part and an upper end of the first external part to each other to close the first temperature control space; and
 a bottom external part sealing and coupled with a lower part of the first internal part and a lower part of the second internal part so that the lower part of the first internal part is spaced from the lower part of the second internal part,
 wherein the first upper sealed part is configured to be opened to allow an external reactant liquid to enter into the first temperature control space and react exothermically or endothermic ally with the first temperature control member disposes in the first temperature control space, the exothermic or endothermic reaction within the first temperature space configured to increase or decrease a temperature of contents within the accommodating space,
 wherein a first surface of the bottom external part is coupled with a lower internal surface of the first internal part and a lower internal surface of the second internal part respectively, so that a plane connecting between a lower end of the first internal part and a lower end of the second internal part is at least partially spaced apart from a second surface of the bottom external part,
 wherein the bottom external part is a discrete component separate from the first internal part and the second internal part, and coupled with a lower part of the first internal part and a lower part of the second internal part so as to be convex from a bottom surface on which the standing pouch is placed,
 wherein the bottom external part in combination with the first internal part and the second internal part define the accommodating space configured to receive and contain the contents to be heated or cooled.

2. The standing pouch of claim 1, wherein a sealed part of the first internal part and the first external part has a different width in a transverse direction.

3. The standing pouch of claim 1, further comprising a first ripping part which is formed on at least one of the first internal part, the second internal part, and the first external part to rip the first internal part and the first external part in a transverse direction so that the first temperature control space is open.

4. The standing pouch of claim 3, wherein the first internal part and the second internal part are sealed so that the first internal part and the second internal part are attached to each other even though the first internal part and the first external part are ripped in the transverse direction using the first ripping part.

5. The standing pouch of claim 4, further comprising a second ripping part which rips the first internal part and the second internal part which are sealed, in the transverse direction so that the accommodating space is open.

6. The standing pouch of claim 1, further comprising:
 a second external part which is disposed to face the second internal part in order to form a second temperature control space; and
 a second temperature control member which is disposed in the second temperature control space,
 wherein the second internal part and the second external part are sealed to close the second temperature control space.

7. The standing pouch of claim 6, wherein a sealed part of the second internal part and the second external part has a different width in a transverse direction.

8. The standing pouch of claim 7, further comprising a first ripping part which is formed on at least one of the first external part and the second external part to rip the first pack, the first external part, and the second external part in the transverse direction so that at least one of the first temperature control space and the second temperature control space is open.

9. The standing pouch of claim 8, wherein the first internal part and the second internal part are sealed so that the first internal part and the second internal part are kept attached to each other when the first external part and the second external part are ripped in the transverse direction using the first ripping part.

10. The standing pouch of claim 9, further comprising a second ripping part which is formed on at least one of the first external part and the second external part in order to rip the first internal part and the second internal part which are sealed, in the transverse direction so that the accommodating space is open.

11. The standing pouch of claim 1, wherein the upper end of the first internal part and an upper end of the second internal part are configured to be sealed together so that the accommodating space is in a closed state.

12. The standing pouch of claim 1, wherein the temperature control member includes one of a heat releasing member or a heat absorbing member, that is enclosed by a nonwoven fabric having a hygroscopic property configured to absorb the reactant liquid.

* * * * *